(12) United States Patent
Sato et al.

(10) Patent No.: US 12,222,553 B2
(45) Date of Patent: Feb. 11, 2025

(54) LIGHT GUIDE ELEMENT, IMAGE DISPLAY DEVICE, AND SENSING APPARATUS

(71) Applicant: FUJIFILM Corporation, Tokyo (JP)

(72) Inventors: Hiroshi Sato, Minami-ashigara (JP); Yukito Saitoh, Minami-ashigara (JP); Katsumi Sasata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 818 days.

(21) Appl. No.: 17/344,181

(22) Filed: Jun. 10, 2021

(65) Prior Publication Data

US 2021/0311259 A1 Oct. 7, 2021

Related U.S. Application Data

(63) Continuation of application No. PCT/JP2019/048512, filed on Dec. 11, 2019.

(30) Foreign Application Priority Data

Dec. 11, 2018 (JP) ................................ 2018-231788

(51) Int. Cl.
*G02B 6/00* (2006.01)
*F21V 8/00* (2006.01)
(Continued)

(52) U.S. Cl.
CPC .............. *G02B 6/34* (2013.01); *G02B 5/1828* (2013.01); *G02B 6/0016* (2013.01);
(Continued)

(58) Field of Classification Search
CPC .................................. G02B 5/18; G02B 6/00
(Continued)

(56) References Cited

U.S. PATENT DOCUMENTS 9,846,967 B2 * 12/2017 Schowengerdt ....... G02B 17/08
10,216,061 B2 * 2/2019 Popovich .......... H01L 27/14625
(Continued)

FOREIGN PATENT DOCUMENTS

CN 101460884 A 6/2009
CN 102246089 A 11/2011
(Continued)

OTHER PUBLICATIONS

International Preliminary Report on Patentability and Written Opinion of the International Searching Authority, with an English translation (forms PCT/IB/373 and PCT/ISA/237), dated Jun. 8, 2021, for corresponding International Application No. PCT/JP2019/048512.
(Continued)

*Primary Examiner* — Kaveh C Kianni
(74) *Attorney, Agent, or Firm* — Birch, Stewart, Kolasch & Birch, LLP

(57) ABSTRACT

Provided are a light guide element in which incidence light can be emitted with high use efficiency and a wide FOV can be obtained for use in AR glasses, and an image display device and a sensing apparatus that include the light guide element. The light guide element includes a light guide plate and first to third diffraction elements, in which the first diffraction element diffracts incidence light in two or more different directions to be incident into the light guide plate, the second diffraction element includes a plurality of diffraction elements that diffract the light to the third diffraction element, the third diffraction element emits the light from the light guide plate, and at least one of the first diffraction element or the third diffraction element has a liquid crystal alignment pattern in which a direction of an optical axis derived from the liquid crystal compound changes while continuously rotating in at least one in-plane direction.

18 Claims, 11 Drawing Sheets

(51) Int. Cl.
*G02B 5/18* (2006.01)
*G02B 6/10* (2006.01)
*G02B 6/34* (2006.01)
*G02B 27/00* (2006.01)
*G02B 27/01* (2006.01)

(52) U.S. Cl.
CPC ........... *G02B 6/0036* (2013.01); *G02B 6/102* (2013.01); *G02B 27/0093* (2013.01); *G02B 27/0101* (2013.01)

(58) Field of Classification Search
USPC .......................................................... 385/37
See application file for complete search history.

(56) References Cited

U.S. PATENT DOCUMENTS

| | | | | |
|---|---|---|---|---|
| 10,459,145 | B2 * | 10/2019 | Popovich | G02B 6/0026 |
| 10,921,630 | B2 * | 2/2021 | Oh | G02B 5/1847 |
| 11,378,864 | B2 * | 7/2022 | Oh | G02F 1/0045 |
| 11,435,572 | B2 * | 9/2022 | Yeoh | G02B 26/123 |
| 11,531,244 | B2 * | 12/2022 | Oh | G02F 1/0136 |
| 11,726,323 | B2 * | 8/2023 | Popovich | G02B 27/01 359/13 |
| 2011/0096401 | A1 | 4/2011 | Levola | |
| 2013/0335683 | A1 * | 12/2013 | Escuti | G02F 1/133528 349/96 |
| 2014/0300966 | A1 * | 10/2014 | Travers | G02B 27/0172 359/558 |
| 2016/0033698 | A1 | 2/2016 | Escuti et al. | |
| 2017/0322419 | A1 * | 11/2017 | TeKolste | G02B 6/0025 |
| 2017/0373459 | A1 | 12/2017 | Weng et al. | |
| 2018/0113309 | A1 | 4/2018 | Robbins et al. | |
| 2018/0143438 | A1 * | 5/2018 | Oh | G02B 27/0172 |
| 2018/0143485 | A1 * | 5/2018 | Oh | G02B 27/4272 |
| 2018/0143509 | A1 * | 5/2018 | Oh | G02B 6/00 |
| 2018/0164627 | A1 * | 6/2018 | Oh | G02F 1/29 |
| 2018/0239177 | A1 * | 8/2018 | Oh | G02F 1/13306 |
| 2018/0275350 | A1 * | 9/2018 | Oh | G02B 27/0172 |
| 2018/0275410 | A1 * | 9/2018 | Yeoh | H04N 13/279 |
| 2018/0284460 | A1 * | 10/2018 | Cheng | G02B 27/0172 |
| 2019/0086674 | A1 * | 3/2019 | Sinay | G02B 27/0093 |
| 2019/0227375 | A1 * | 7/2019 | Oh | G02B 5/1833 |
| 2019/0287495 | A1 * | 9/2019 | Mathur | G02B 27/0172 |
| 2021/0011295 | A1 | 1/2021 | Sato et al. | |
| 2021/0231986 | A1 * | 7/2021 | Oh | G02B 6/00 |
| 2021/0318566 | A1 * | 10/2021 | Oh | G02F 1/0136 |
| 2022/0011578 | A1 * | 1/2022 | Sinay | G02B 27/4205 |
| 2022/0035161 | A1 * | 2/2022 | Sinay | G02B 27/0172 |
| 2023/0251492 | A1 * | 8/2023 | Yeoh | H04N 13/341 345/8 |

FOREIGN PATENT DOCUMENTS

| | | | | |
|---|---|---|---|---|
| CN | 103823267 A | * | 5/2014 | ......... G02B 27/0101 |
| JP | 2009-539129 A | | 11/2009 | |
| JP | 2017-522601 A | | 8/2017 | |
| WO | WO-2010137263 A1 | * | 12/2010 | ............ G02B 6/005 |
| WO | WO 2017/180403 A1 | | 10/2017 | |
| WO | WO-2018094093 A1 | * | 5/2018 | ......... G02B 27/0172 |
| WO | WO-2018175488 A1 | * | 9/2018 | ......... G02B 27/0093 |
| WO | WO 2019/189852 A1 | | 10/2019 | |

OTHER PUBLICATIONS

International Search Report (form PCT/ISA/210), dated Mar. 10, 2020, for corresponding International Application No. PCT/JP2019/048512, with an English translation.

Kress et al., "Towards the Ultimate Mixed Reality Experience: HoloLens Display Architecture Choices," SID 2017 Digest, 2017, pp. 127-131.

Japanese Office Action dated Jul. 5, 2022 for corresponding Application No. 2020-559291, with an English translation.

Chinese Office Action and Search Report for corresponding Chinese Application No. 201980082226.1. dated Aug. 3, 2022, with an English translation.

Chinese Office Action for corresponding Chinese Application No. 201980082226.1, dated Feb. 8, 2023, with an English translation.

* cited by examiner

LIGHT GUIDE ELEMENT, IMAGE DISPLAY DEVICE, AND SENSING APPARATUS

CROSS-REFERENCE TO RELATED APPLICATIONS

This application is a Continuation of PCT International Application No. PCT/JP2019/048512 filed on Dec. 11, 2019, which claims priority under 35 U.S.C. § 119(a) to Japanese Patent Application No. 2018-231788 filed on Dec. 11, 2018. Each of the above applications is hereby expressly incorporated by reference, in its entirety, into the present application.

BACKGROUND OF THE INVENTION

1. Field of the Invention

The present invention relates to a light guide element that propagates light, and an image display device and a sensing apparatus that include the light guide element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using a diffraction element to be incident into one end portion of a light guide plate. As a result, the light is introduced into the light guide plate at an angle such that the light is totally reflected and propagates in the light guide plate. The light propagated in the light guide plate is also diffracted by the diffraction element in the other end portion of the light guide plate and is emitted from the light guide plate to an observation position by the user.

For AR glasses, it is required that a field of view (FOV) that is a region where an image is displayed is wide.

In order to meet the requirement, various techniques are disclosed. For example, as an optical waveguide that can extend the FOV of AR glasses, WO2017/180403A discloses an optical waveguide in which an input-coupler, a first intermediate-component and a second intermediate-component provided to be spaced from each other in a plane direction of the light guide plate, and an output-coupler are provided on a light guide plate (bulk substrate of the optical waveguide).

In the optical waveguide, an image displayed on a display is emitted to an input-coupler. The input-coupler diffracts a part of the image (light corresponding to the light) to the first intermediate-component, and diffracts a part of the image to the second intermediate-component. Both the first intermediate-component and the second intermediate-component diffract an image propagated through the waveguide to the output-coupler. The output-coupler combines images propagated through the waveguide and diffracts the combined image to emit the combined image from the light guide plate.

The optical waveguide described in WO2017/180403A extends the FOV by diffracting an image to the first intermediate-component and the second intermediate-component disposed to be spaced from each other.

SUMMARY OF THE INVENTION

In the optical waveguide described in WO2017/180403A, all the input-coupler, the first intermediate-component, the second intermediate-component, and the output-coupler are diffraction gratings (diffraction elements).

In the optical waveguide described in WO2017/180403A, a surface relief grating is used as the diffraction grating. The surface relief grating has a periodic structure (periodic change) on a surface and is, for example, a diffraction grating in which a periodic groove (grating line) or the like is provided on the surface.

By using the optical waveguide described in WO2017/180403A for AR glasses, the FOV can be extended.

However, in the optical waveguide described in WO2017/180403A, a surface relief grating is used as the diffraction grating. Therefore, light use efficiency is low, and for example, in a case where the optical waveguide is used for AR glasses or the like, an image to be observed by a user is darker than an image displayed by a display device.

An object of the present invention is to solve the problems in the related art and to provide a light guide element that can emit incident light with high light use efficiency and can extend the FOV for use in AR glasses or the like, and an image display device and a sensing apparatus that include the light guide element.

In order to achieve the object, the present invention has the following configurations.

[1] A light guide element comprising:
 a light guide plate; and
 a first diffraction element, a second diffraction element, and a third diffraction element that are provided on the light guide plate,
 in which the first diffraction element diffracts incident light in two or more different directions to be incident into the light guide plate,
 the second diffraction element includes a plurality of diffraction elements that are provided to be spaced from each other and diffract the light diffracted by the first diffraction element and propagated in the light guide plate to the third diffraction element,
 the third diffraction element emits the light from the light guide plate, and
 at least one of the first diffraction element or the third diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction.

[2] The light guide element according to [1],
 in which the first diffraction element includes a first A diffraction element and a first B diffraction element that are laminated and diffract light in different directions.

[3] The light guide element according to [1],
 in which the first diffraction element includes a first A diffraction element and a first B diffraction element that are arranged at different positions in a plane direction of the light guide plate and diffract light in different directions.

[4] The light guide element according to [2] or [3],
in which the first diffraction element is the liquid crystal diffraction element,
the first A diffraction element and the first B diffraction element have a region where the direction of the optical axis of the liquid crystal compound is helically twisted in a thickness direction and rotates, and
in the first A diffraction element and the first B diffraction element, directions of the helical twist rotation in the thickness direction are opposite to each other and rotation directions of the direction of the optical axis derived from the liquid crystal compound that continuously rotates in at least one in-plane direction in the liquid crystal alignment pattern are the same.

[5] The light guide element according to [2] or [3],
in which the first diffraction element is the liquid crystal diffraction element,
the first A diffraction element and the first B diffraction element have a region where the direction of the optical axis of the liquid crystal compound is helically twisted in a thickness direction and rotates, and
in the first A diffraction element and the first B diffraction element, directions of the helical twist rotation in the thickness direction are the same and rotation directions of the direction of the optical axis derived from the liquid crystal compound that continuously rotates in at least one in-plane direction in the liquid crystal alignment pattern are different from each other.

[6] The light guide element according to any one of [1] to [5],
in which the third diffraction element includes a third A diffraction element and a third B diffraction element that are laminated.

[7] The light guide element according to any one of [1] to [6],
in which the third diffraction element is a liquid crystal diffraction element and includes a third A diffraction element and a third B diffraction element, and
in the third A diffraction element and the third B diffraction element, one in-plane directions in which the direction of the optical axis derived from the liquid crystal compound continuously rotates in the liquid crystal alignment pattern intersect with each other.

[8] The light guide element according to any one of [1] to [7],
in which the third diffraction element is a liquid crystal diffraction element and has a region where the direction of the optical axis of the liquid crystal compound is helically twisted and rotates.

[9] The light guide element according to any one of [1] to [8],
in which the first diffraction element and the third diffraction element are the liquid crystal diffraction elements, and in the first diffraction element and the third diffraction element, one in-plane directions in which the direction of the optical axis derived from the liquid crystal compound continuously rotates in the liquid crystal alignment pattern intersect with each other.

[10] The light guide element according to any one of [1] to [9],
in which the first diffraction element, the second diffraction element, and the third diffraction element are the liquid crystal diffraction elements, in the first diffraction element, the second diffraction element, and the third diffraction element, the one in-plane directions in which the direction of the optical axis derived from the liquid crystal compound continuously rotates in the liquid crystal alignment pattern intersect with each other, and
in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, the single period of the second diffraction element is shorter than the single periods of the first diffraction element and the third diffraction element.

[11] The light guide element according to any one of [1] to [10],
in which the liquid crystal diffraction element includes a cholesteric liquid crystal layer obtained by immobilizing a cholesteric liquid crystalline phase.

[12] The light guide element according to any one of [1] to [11],
in which in a case where an in-plane retardation is measured from a direction tilted with respect to a normal direction and a normal line of a main surface of the liquid crystal diffraction element, a direction in which the in-plane retardation is minimum in any one of a slow axis plane or a fast axis plane is tilted from the normal direction.

[13] The light guide element according to any one of [1] to [12],
in which in a cross-section of the liquid crystal layer observed with a scanning electron microscope, bright portions and dark portions derived from a liquid crystal phase are tilted with respect to a main surface of the liquid crystal layer, and
in a case where an interval of lines between the bright portions or lines between the dark portions in the normal direction is represented by an ½ slope pitch, a region where the slope pitch of the liquid crystal layer varies depending on positions in a thickness direction is provided.

[14] The light guide element according to [13],
in which a region where the slope pitch continuously increases or decreases in one direction of the thickness direction is provided.

[15] The light guide element according to any one of [1] to [14],
in which in a cross-section of the liquid crystal layer observed with a scanning electron microscope, bright portions and dark portions derived from a liquid crystal phase are tilted with respect to a main surface of the liquid crystal layer, and
in a case where a tilt angle of a line between the bright portions or between the dark portions with respect to a main surface of the liquid crystal layer is represented by $\theta_{hp}$, a region where the tilt angle $\theta_{hp}$ varies depending on positions in a thickness direction is provided.

[16] The light guide element according to [15],
in which a region where the tilt angle $\theta_{hp}$ continuously increases or decreases in one direction of the thickness direction is provided.

[17] The light guide element according to any one of [1] to [16],
in which in a case where, in the liquid crystal alignment pattern of the liquid crystal diffraction element, a length over which the direction of the optical axis derived from the liquid crystal compound rotates by 180° in the one in-plane direction in which the direction of the optical axis derived from the liquid crystal compound changes while continuously rotating is set as a single period, the single period is 1 µm or less.

[18] The light guide element according to any one of [1] to [17],
in which each of the first diffraction element, the second diffraction element, and the third diffraction element is the liquid crystal diffraction element and includes a blue diffraction layer corresponding to a blue image, a green diffraction layer corresponding to a green image, and a red diffraction layer corresponding to a red image and
in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, the red diffraction layer has a longest single period and the blue diffraction layer has a shortest single period.

[19] The light guide element according to [18],
in which the blue diffraction layer, the green diffraction layer, and the red diffraction layer include a cholesteric liquid crystal layer obtained by immobilizing a cholesteric liquid crystalline phase, and
a permutation of the single periods in the cholesteric liquid crystal layers of the blue diffraction layer, the green diffraction layer, and the red diffraction layer matches a permutation of selective reflection center wavelengths in the cholesteric liquid crystal layers.

[20] The light guide element according to [18] or [19],
in which the blue diffraction layer, the green diffraction layer, and the red diffraction layer include a cholesteric liquid crystal layer obtained by immobilizing a cholesteric liquid crystalline phase, and
in a case where the single periods in the liquid crystal alignment patterns of the blue diffraction layer, the green diffraction layer, and the red diffraction layer are represented by $\Lambda_B$, $\Lambda_G$, and $\Lambda_R$, respectively, and
the slope pitches of the blue diffraction layer, the green diffraction layer, and the red diffraction layer are represented by $Pt_B$, $Pt_G$, and $Pt_R$, respectively, $$\Lambda_B < \Lambda_G < \Lambda_R \text{ and } Pt_B < Pt_G < Pt_R$$

are satisfied.

[21] The light guide element according to any one of [1] to [17],
in which the first diffraction element, the second diffraction element, and the third diffraction element are liquid crystal diffraction elements,
in a case where a wavelength range of visible light is divided into two wavelength ranges, each of the first diffraction element, the second diffraction element, and the third diffraction element includes a short wavelength side diffraction layer corresponding to a short wavelength side image and a long wavelength side diffraction layer corresponding to a long wavelength side image among the two wavelength ranges, and
in a case where, in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, the single period of the long wavelength side diffraction layer is longer than the single period of the short wavelength side diffraction layer.

[22] The light guide element according to [21],
in which the long wavelength side diffraction layer and the short wavelength side diffraction layer include a cholesteric liquid crystal layer obtained by immobilizing a cholesteric liquid crystalline phase, and
a permutation of the single periods in the cholesteric liquid crystal layers of the long wavelength side diffraction layer and the short wavelength side diffraction layer matches a permutation of selective reflection center wavelengths in the cholesteric liquid crystal layers.

[23] The light guide element according to [21] or [22],
in which the long wavelength side diffraction layer and the short wavelength side diffraction layer include a cholesteric liquid crystal layer obtained by immobilizing a cholesteric liquid crystalline phase, and
in a case where the single periods in the liquid crystal alignment patterns of the long wavelength side diffraction layer and the short wavelength side diffraction layer are represented by $\Lambda_S$ and $\Lambda_L$, respectively, and
the slope pitches of the long wavelength side diffraction layer and the short wavelength side diffraction layer are represented by $Pt_S$ and $Pt_L$, respectively, $$\Lambda_S < \Lambda_L \text{ and } Pt_S < Pt_L$$

are satisfied.

[24] An image display device comprising:
the light guide element according to any one of [1] to [23]; and
a display element that emits an image to the first diffraction element of the light guide element.

[25] The image display device according to [24],
in which the display element emits circularly polarized light to the first diffraction element.

[26] A sensing apparatus comprising:
the light guide element according to any one of [1] to [17]; and
a light source that emits infrared light to the first diffraction element of the light guide element.

[27] The sensing apparatus according to [26],
in which the light source emits circularly polarized light to the first diffraction element.

The light guide element according to an aspect of the present invention can emit incident light with high light use efficiency. In addition, by using the image display device according to an aspect of the present invention including the light guide element for AR glasses or the like, an image can be displayed at a wide field of view.

DESCRIPTION OF THE PREFERRED EMBODIMENTS

Hereinafter, a light guide element, an image display device, and a sensing apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
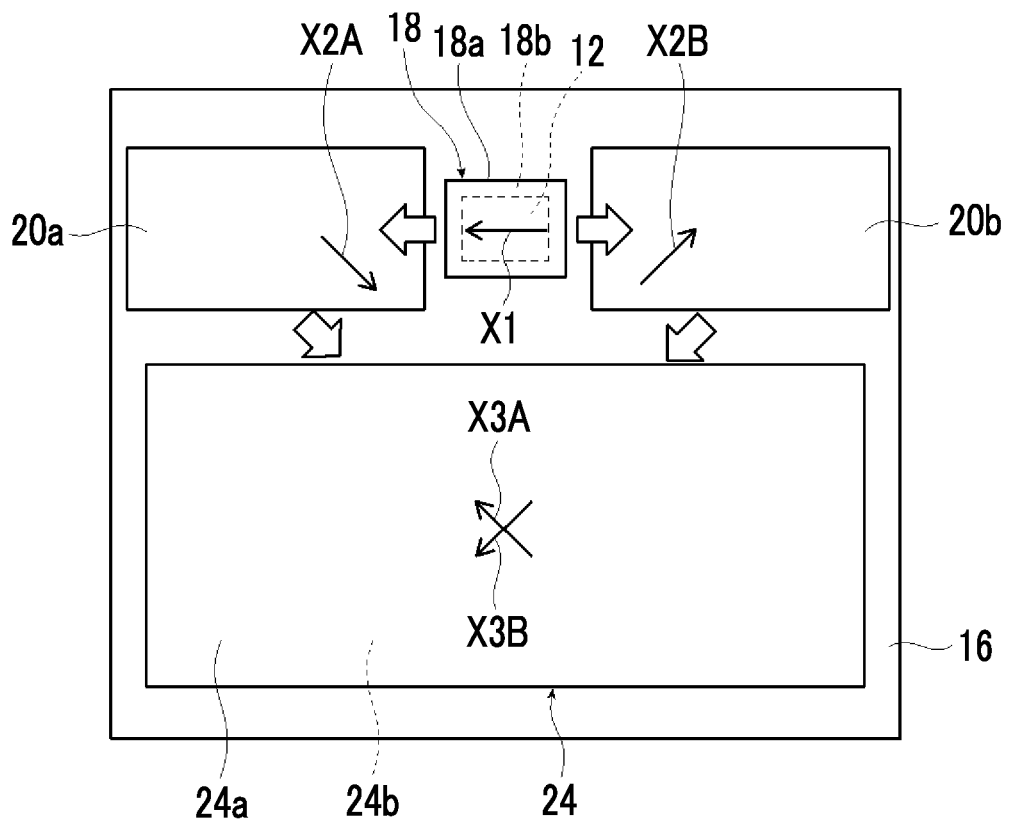
FIG. 1 is a plan view conceptually showing an example of an image display device according to the present invention including a light guide element according to the present invention.
Figure 2:
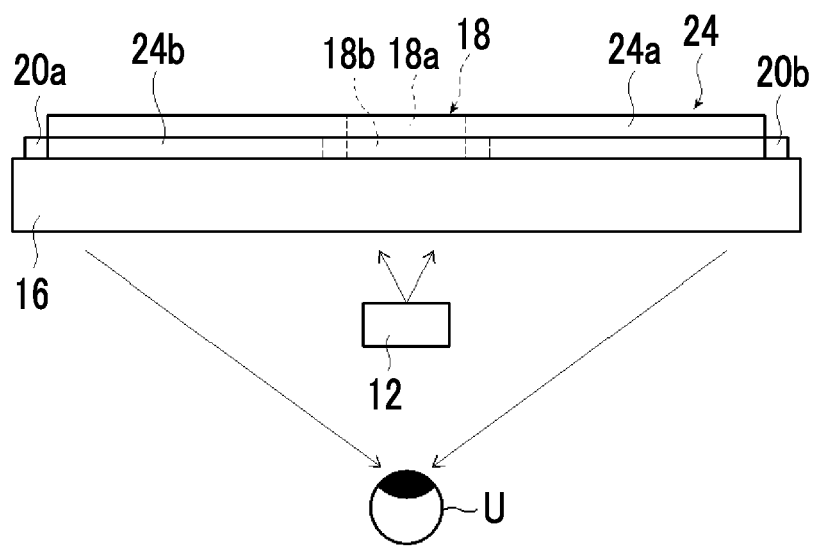
FIG. 2 is a front view conceptually showing the image display device shown in FIG. 1.
Figure 3:
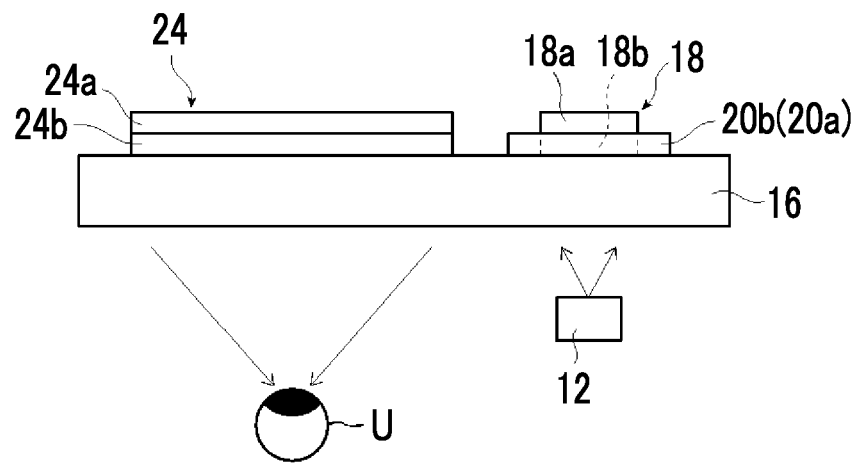
FIG. 3 is a side view conceptually showing the image display device shown in FIG. 1.

FIGS. 1 to 3 conceptually shows an example of the image display device according to the embodiment of the present invention including the light guide element according to the embodiment of the present invention. FIG. 1 is a plan view showing the image display device 10 in case of being seen from a side opposite to an observation side by a user U. FIG. 2 is a front view showing the image display device 10 in case of being seen from a lower direction on the paper plane of FIG. 1. FIG. 3 is a side view showing the image display device 10 in case of being seen from the right side on the paper plane of FIG. 1.

An image display device 10 shown in FIG. 1 is used as AR glasses as a preferable example. The diffraction element and the light guide element according to the embodiment of the present invention can also be used not only as AR glasses but also as an optical element such as a transparent screen, a head-up display (HUD), a lighting device, or a sensor. The lighting device includes, for example, a backlight unit of a liquid crystal display. In addition, the image display device according to the embodiment of the present invention can also be used as an image display device including the optical element.

An image display device 10 shown in FIG. 1 includes a display element 12, a light guide plate 16, and a first diffraction element 18, a second A diffraction element 20a, a second B diffraction element 20b, and a third diffraction element 24 that are provided on the light guide plate 16, the second A diffraction element 20a and the second B diffraction element 20b being arranged to be spaced from each other in a plane direction of the light guide plate 16.

Although described below, in the image display device 10, an image (light corresponding to the image) displayed by the display element 12 is diffracted by the first diffraction element 18 in different two directions to be incident into the light guide plate 16. The diffracted light by the first diffraction element 18 is totally reflected and propagates in the light guide plate 16 such that one diffracted light is incident into the second A diffraction element 20a and another diffracted light is incident into the second B diffraction element 20b. The light components incident into the second A diffraction element 20a and the second B diffraction element 20b are diffracted to the third diffraction element 24, are totally reflected and propagate in the light guide plate 16, are incident into the third diffraction element 24, are diffracted by the third diffraction element 24, are emitted from the light guide plate 16, and are observed by the user U.

[Display Element]

The display element 12 displays an image (video) to be observed by the user U and emits the image to first diffraction element 18.

In the image display device 10 according to the embodiment of the present invention, as the display element 12, various well-known display elements (a display device or a projector) used for AR glasses or the like can be used without any particular limitation. Examples of the display element 12 include a display element including a display and a projection lens.

In the image display device 10 according to the embodiment of the present invention, the display is not particularly limited. For example, various well-known displays used in AR glasses or the like can be used.

Examples of the display include a liquid crystal display (LCOS including Liquid Crystal On Silicon), an organic electroluminescence display, and a scanning type display employing a digital light processing (DLP) or Micro Electro Mechanical Systems (MEMS) mirror.

The display may display a monochrome image, a two-color image, or a color image. The image display device 10 in the example shown in the drawing displays, for example, a red monochrome image, and the display displays a red monochrome image.

In the display element 12 used in the image display device 10 according to the embodiment of the present invention, the projection lens is also a well-known projection lens (collecting lens) used for AR glasses or the like.

Here, in the image display device 10 according to the embodiment of the present invention, a display image by the display element 12, that is, light to be emitted from the display element 12 is not limited and is preferably unpolarized light (natural light) or circularly polarized light.

In a case where the display element 12 emits circularly polarized light and the display emits an unpolarized light image, and it is preferable that the display element 12 includes, for example, a circular polarization plate including a linear polarizer and an λ/4 plate. In addition, in a case where the display emits a linearly polarized light image, it is preferable that the display element 12 includes, for example, a λ/4 plate.

The light to be emitted by the display element 12 may be, for example, another polarized light such as linearly polarized light.

[Light Guide Plate]

In the image display device 10, the light guide plate 16 is a well-known light guide plate that reflects light incident thereinto and guides (propagates) the reflected light. The light guide plate 16, the first diffraction element 18, the second A diffraction element 20a, the second B diffraction element 20b, and the third diffraction element 24 configure the light guide element according to the embodiment of the present invention.

As the light guide plate 16, various well-known light guide plates used for a backlight unit or the like of AR glasses or a liquid crystal display can be used without any particular limitation.

[Diffraction Element]

The image display device 10 includes the first diffraction element 18, the second A diffraction element 20a, the second B diffraction element 20b, and the third diffraction element 24 on a main surface of the light guide plate 16. The main surface is the maximum surface of a sheet-shaped material (for example, a plate-shaped material, a film, or a layer). In the example shown in the drawing, the first diffraction element 18, the second A diffraction element 20a, the second B diffraction element 20b, and the third diffraction element 24 are provided on the same main surface of the light guide plate 16. The respective diffraction elements may be provided on different main surfaces as long as the main surfaces are main surfaces of the light guide plate 16.

In the first diffraction element 18, a first A diffraction element 18a and a first B diffraction element 18b are laminated. The second A diffraction element 20a and the second B diffraction element 20b configure the second diffraction element according to the embodiment of the present invention. In addition, in the third diffraction element 24, a third A diffraction element 24a and a third B diffraction element 24b are laminated.

Although not shown in the drawing, the first diffraction element 18, the second A diffraction element 20a, the second B diffraction element 20b, and the third diffraction element 24 are bonded to the light guide plate through a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the first diffraction element 18, the second A diffraction element 20a, the second B diffraction element 20b, the third diffraction element 24, and the light guide plate 16 may be laminated and held by a frame, a holding device, or the like to configure the light guide element according to the embodiment of the present invention.

Further, the first diffraction element 18, the second A diffraction element 20a, the second B diffraction element 20b, and the third diffraction element 24 may be formed directly on the light guide plate 16.

The first A diffraction element 18a and the first B diffraction element 18b of the first diffraction element 18 and the third A diffraction element 24a and the third B diffraction element 24b of the third diffraction element 24 are cholesteric liquid crystal layers obtained by immobilizing a cholesteric liquid crystalline phase.

In addition, the second A diffraction element 20a and the second B diffraction element 20b include the same cholesteric liquid crystal layer.

Figure 4:
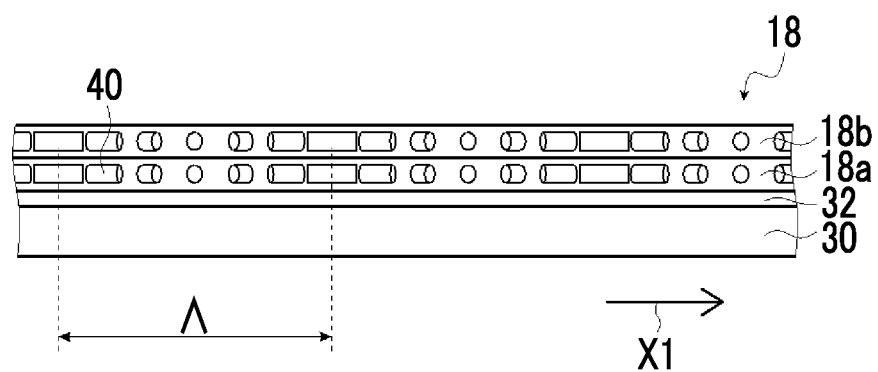
FIG. 4 is a diagram conceptually showing an example of a first diffraction element.

FIG. 4 conceptually shows the first diffraction element 18. As shown in FIG. 4, the first diffraction element 18 includes a support 30, an alignment film 32, and the first A diffraction element 18a and the first B diffraction element 18b that are cholesteric liquid crystal layers.

In the image display device 10 (light guide element) in the example shown in the drawing, basically, the third diffraction element 24 also has the same layer configuration as the first diffraction element 18 shown in the FIG. 3. In addition, basically, the second A diffraction element 20a and the second B diffraction element 20b have the same layer configuration as the first diffraction element 18 shown in FIG. 3, except that the second A diffraction element 20a and the second B diffraction element 20b include only one cholesteric liquid crystal layer.

Accordingly, in the following description, the first diffraction element 18 will be described as a representative example. Basically, the second A diffraction element 20a, the second B diffraction element 20b, and the third diffraction element 24 have the same configuration, effects, and the like as the first diffraction element 18.

In order to simplify the drawings, FIGS. 1 to 3 does not show the supports 30 and the alignment films 32 in the first diffraction element 18, the second A diffraction element 20a, the second B diffraction element 20b, and the third diffraction element 24.

The first diffraction element 18 in the drawing shown in the drawing includes the support 30, the alignment film 32, the first A diffraction element 18a, and the first B diffraction element 18b, but the present invention is not limited thereto.

In the image display device (light guide element) according to the embodiment of the present invention, for example, the support 30 may be peeled off after bonding the first diffraction element 18 to the light guide plate 16 such that the first diffraction element includes only the alignment film 32, the first A diffraction element 18a, and the first B diffraction element 18b. Alternatively, for example, the support 30 and the alignment film 32 may be peeled off after bonding the first diffraction element 18 to the light guide plate 16 such that the first diffraction element 18 includes only the first A diffraction element 18a and the first B diffraction element 18b.

<Support>

In the first diffraction element 18, the support 30 supports the alignment film 32, the first A diffraction element 18*a*, and the first B diffraction element 18*b*.

In the following description, in a case where it is not necessary to distinguish between the first A diffraction element 18*a* and the first B diffraction element 18*b*, the first A diffraction element 18*a* and the first B diffraction element 18*b* will be collectively referred to as "cholesteric liquid crystal layer".

As the support 30, various sheet-shaped materials (films or plate-shaped materials) can be used as long as they can support the alignment film 32 and the cholesteric liquid crystal layer.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the first diffraction element 18, a material for forming the support 30, and the like in a range where the alignment film 32 and the cholesteric liquid crystal layer can be supported.

The thickness of the support 30 is preferably 1 to 1000 μm, more preferably 3 to 250 μm, and still more preferably 5 to 150 μm.

The support 30 may have a single-layer structure or a multi-layer structure.

In a case where the support 30 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a single-layer structure that is provided as a substrate; and another layer that is provided on a surface of the substrate.

<Alignment Film>

In the first diffraction element 18, the alignment film 32 is formed on a surface of the support 30.

The alignment film 32 is an alignment film for aligning a liquid crystal compound 40 to a predetermined liquid crystal alignment pattern during the formation of the first A diffraction element 18*a* of the first diffraction element 18.

Although described below, in the first diffraction element 18 according to the embodiment of the present invention, the first A diffraction element 18*a* as the cholesteric liquid crystal layer has a liquid crystal alignment pattern in which a direction of an optical axis 40A (refer to FIG. 6) derived from the liquid crystal compound 40 changes while continuously rotating in one in-plane direction. Accordingly, the alignment film 32 is formed such that the liquid first A diffraction element 18*a* can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the first diffraction element 18, for example, the alignment film 32 can be suitably used as a so-called photo-alignment film obtained by irradiating a photo-alignable material with polarized light or non-polarized light. That is, in the first diffraction element 18 according to the embodiment of the present invention, a photo-alignment film that is formed by applying a photo-alignable material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitability used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 μm and more preferably 0.05 to 2 μm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 15:
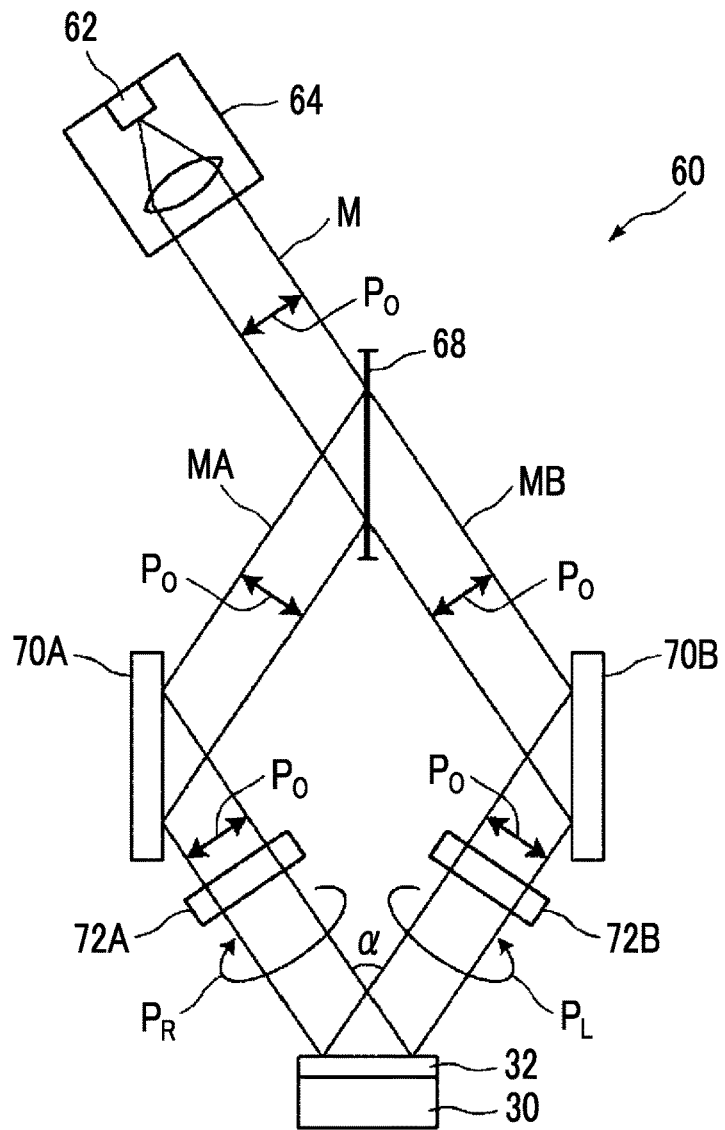
FIG. 15 is a conceptual diagram showing another example of an exposure device that exposes an alignment film of the diffraction element shown in FIG. 3.

FIG. 15 conceptually shows an example of an exposure device that exposes the alignment film 32 to form an alignment pattern.

An exposure device 60 shown in FIG. 15 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 30 including the alignment film 32 on which the alignment pattern is not yet formed is disposed at an exposed portion, the two beams MA and MB intersect and interfere each other on the alignment film 32, and the alignment film 32 is irradiated with and exposed to the interference light.

Due to the interference in this case, the polarization state of light with which the alignment film 32 is irradiated periodically changes according to interference fringes. As a result, in the alignment film 32, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 32 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

In the optical element according to the embodiment of the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, or the like, the cholesteric liquid crystal layer or the like has the liquid crystal alignment pattern in which the direction of the optical axis 40A derived from the liquid crystal compound 40 changes while continuously rotating in at least one in-plane direction. That is, in the present invention, the support 30 can be made to function as the alignment film.

<Cholesteric Liquid Crystal Layer>

In the first diffraction element 18, the first A diffraction element 18a is formed on a surface of the alignment film 32. Further, in the first diffraction element 18, the first B diffraction element 18b is formed on a surface of the first A diffraction element 18a.

As described above, the first A diffraction element 18a and the first B diffraction element 18b are cholesteric liquid crystal layers obtained by immobilizing a cholesteric liquid crystalline phase.

In FIG. 4, in order to simplify the drawing and to clarify the configuration of the first diffraction element 18, only the liquid crystal compound 40 (liquid crystal compound molecules) on the surface of the alignment film 32 and the surface of the first A diffraction element 18a in the first A diffraction element 18a and the first B diffraction element 18b is conceptually shown. However, as conceptually shown in FIG. 5 using the first A diffraction element 18a as an example, each of the first A diffraction element 18a and the first B diffraction element 18b has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360) is set as one helical pitch, and plural pitches of the helically turned liquid crystal compound 40 are laminated.

As is well-known, the cholesteric liquid crystal layer obtained by immobilizing a cholesteric liquid crystalline phase has wavelength selective reflection properties.

Although described below in detail, the selective reflection wavelength range of the cholesteric liquid crystal layer depends on the length of one helical pitch described above in the thickness direction. In a case where the optical axis 40A of the liquid crystal compound 40 is aligned to be parallel to a main surface (X-Y plane) of the cholesteric liquid crystal layer, the length of one helical pitch in the thickness direction is a pitch P shown in FIG. 5. In the first diffraction element 18, the first A diffraction element 18a and the first B diffraction element 18b have the same pitch P. Accordingly, in the first diffraction element 18 in the example shown in the drawing, the first A diffraction element 18a and the first B diffraction element 18b have the same selective reflection center wavelength.

As described above, the first A diffraction element 18a and the first B diffraction element 18b are cholesteric liquid crystal layers obtained by immobilizing a cholesteric liquid crystalline phase.

That is, both the first A diffraction element 18a and the first B diffraction element 18b are formed of the liquid crystal compound 40 (liquid crystal material) having a cholesteric structure.

<<Cholesteric Liquid Crystalline Phase>>

It is known that the cholesteric liquid crystalline phase exhibits selective reflection properties at a specific wavelength.

A center wavelength of selective reflection (selective reflection center wavelength) k of a general cholesteric liquid crystalline phase depends on a helical pitch P in the cholesteric liquid crystalline phase and complies with a relationship of $a,=n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

The helical pitch P refers to one pitch (helical period) of the helical structure of the cholesteric liquid crystalline phase, in other words, one helical turn. That is, the helical pitch refers to the length in a helical axis direction in which a director of the liquid crystal compound constituting the cholesteric liquid crystalline phase rotates by 360°. For example, in the case of rod-shaped liquid crystal, the director of the liquid crystal compound matches a major axis direction.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), pp. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflection properties with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A turning direction of the cholesteric liquid crystalline phase can be adjusted by adjusting the kind of the liquid crystal compound that forms the cholesteric liquid crystal layer and/or the kind of the chiral agent to be added.

In the image display device 10 in the example shown in the drawing, in the first A diffraction element 18a and the first B diffraction element 18b of the first diffraction element 18, helical twisted directions of the cholesteric liquid crystalline phases are different from each other. Accordingly, in the first A diffraction element 18a and the first B diffraction element 18b, turning directions of circularly polarized light to be reflected are different from each other. For example, the first A diffraction element 18a reflects right circularly polarized light of red light, and the first B diffraction element 18b reflects left circularly polarized light of red light.

Regarding this point, in the third A diffraction element 24a and the third B diffraction element 24b of the third diffraction element 24, likewise, the third A diffraction element 24a reflects right circularly polarized light of red light, and the third B diffraction element 24b reflects left circularly polarized light of red light.

In addition, the cholesteric liquid crystal layer of the second A diffraction element 20a reflects right circularly polarized light, and the cholesteric liquid crystal layer of the second B diffraction element 20b reflects left circularly polarized light.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and complies with a relationship of $\Delta\lambda=\Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the diffraction element and may be, for example, 10 to 500 nm and is preferably 20 to 300 nm and more preferably 30 to 100 nm.

<<Method of Forming Cholesteric Liquid Crystal Layer>>

The cholesteric liquid crystal layer (the first A diffraction element 18a and the first B diffraction element 18b) can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, it is preferable that the structure in which a cholesteric liquid crystalline phase is immobilized is a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound.

Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586, WO95/024455, WO97/000600, WO98/023580, WO98/052905, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid alignment of a cholesteric liquid crystalline phase. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-099248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S.

Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide particles, or the like can be added to the liquid crystal composition in a range where optical performance and the like do not deteriorate.

It is preferable that the liquid crystal composition is used as liquid during the formation of the cholesteric liquid crystal layer (the first A diffraction element 18a and the first B diffraction element 18b).

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 32, it is preferable that the cholesteric liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the first diffraction element 18, the light reflectivity required for the cholesteric liquid crystal layer, the material for forming the cholesteric liquid crystal layer, and the like.

<<Liquid Crystal Alignment Pattern of Cholesteric Liquid Crystal Layer>>

As described above, in the first diffraction element 18, the cholesteric liquid crystal layer (the first A diffraction element 18a and the first B diffraction element 18b) has the liquid crystal alignment pattern in which the direction of the optical axis 40A derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-shaped liquid crystal compound, the optical axis 40A is along a rod-shaped major axis direction. In the following description, the optical axis 40A derived from the liquid crystal compound 40 will also be referred to as "the optical axis 40A of the liquid crystal compound 40" or "the optical axis 40A".

Figure 6:
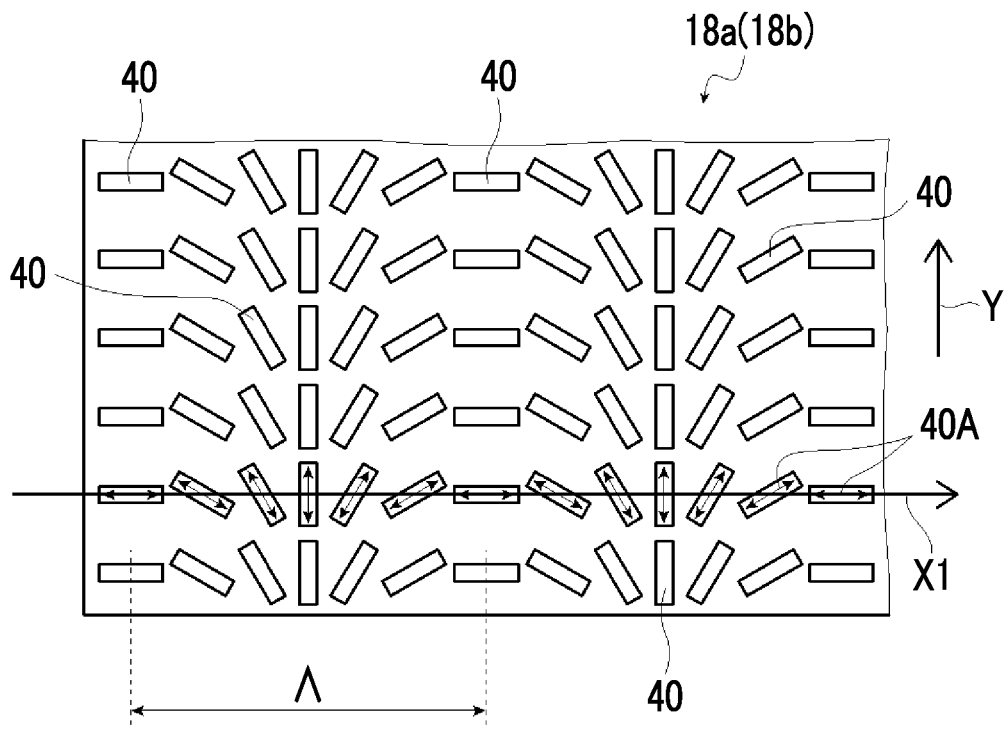
FIG. 6 is a plan view showing a first A diffraction element.

FIG. 6 is a plan view conceptually showing the first A diffraction element 18a.

The plan view is a view in case of being seen in the same direction as that of FIG. 1 and is a view in a case where the first diffraction element 18 is seen from the top in FIGS. 2 to 4, that is a view in a case where the first diffraction element 18 is seen from the thickness direction. The thickness direction of the first diffraction element 18 is a laminating direction of the respective layers (films) of the first diffraction element 18.

In addition, in FIG. 6, in order to clarify the configuration of the first diffraction element 18 according to the embodiment of the present invention, only the liquid crystal compound 40 on the surface of the alignment film 32 is shown as in FIG. 4.

In FIG. 6, the first A diffraction element 18a will be described as a representative example. Basically, the first B diffraction element 18b as the cholesteric liquid crystal layer, the cholesteric liquid crystal layer of the second A diffraction element 20a and the second B diffraction element 20b, and the third A diffraction element 24a and the third B diffraction element 24b as the cholesteric liquid crystal layer have the same configuration as the first A diffraction element 18a and exhibits the same effects as the first A diffraction element 18a.

As shown in FIG. 6, on the surface of the alignment film 32, the liquid crystal compound 40 forming the first A diffraction element 18a as the cholesteric liquid crystal layer has the liquid crystal alignment pattern in which the direction of the optical axis 40A changes while continuously rotating in one predetermined direction indicated by arrow X1 in a plane of the first A diffraction element 18a according to the alignment pattern formed on the alignment film 32 as the lower layer. In the example shown in the drawing, the liquid crystal compound 40 has the liquid crystal alignment pattern in which the optical axis 40A of the liquid crystal compound 40 changes while continuously rotating clockwise in the arrow X1 direction.

The liquid crystal compound 40 forming the first A diffraction element 18a is two-dimensionally arranged in a direction perpendicular to the arrow X1 and the one in-plane direction (arrow X1 direction).

In the following description, the direction perpendicular to the arrow X1 direction will be referred to as "Y direction" for convenience of description. That is, the arrow Y direction is a direction perpendicular to the one in-plane direction in which the direction of the optical axis 40A of the liquid crystal compound 40 changes while continuously rotating in a plane of the cholesteric liquid crystal layer. Accordingly, in FIGS. 4 and 5 and FIG. 7 described below, the Y direction is a direction perpendicular to the paper plane.

In a case where the cholesteric liquid crystal layer is formed on the cholesteric liquid crystal layer using the above-described coating method, the liquid crystal alignment pattern of the upper cholesteric liquid crystal layer follows (conforms) the liquid crystal alignment pattern on the surface of the lower cholesteric liquid crystal layer as a formation surface.

Accordingly, the first B diffraction element 18b as the cholesteric liquid crystal layer that is formed on the first A diffraction element 18a has the same liquid crystal alignment pattern as the first A diffraction element 18a.

Specifically, "the direction of the optical axis 40A of the liquid crystal compound 40 changes while continuously rotating in the arrow X1 direction (the predetermined one in-plane direction)" represents that an angle between the optical axis 40A of the liquid crystal compound 40, which is arranged in the arrow X1 direction, and the arrow X1 direction varies depending on positions in the arrow X1 direction, and the angle between the optical axis 40A and the arrow X1 direction sequentially changes from θ to θ+180° or θ−180° in the arrow X1 direction.

A difference between the angles of the optical axes 40A of the liquid crystal compound 40 adjacent to each other in the arrow X1 direction is preferably 45° or less, more preferably 15° or less, and still more preferably less than 15°.

On the other hand, in the liquid crystal compound 40 forming first A diffraction element 18a, the directions of the optical axes 40A are the same in the Y direction perpendicular to the arrow X1 direction, that is, the Y direction perpendicular to the one in-plane direction in which the optical axis 40A continuously rotates.

In other words, in the liquid crystal compound 40 forming the first A diffraction element 18a, angles between the optical axes 40A of the liquid crystal compound 40 and the arrow X1 direction are the same in the Y direction.

In the first A diffraction element 18a according to the embodiment of the present invention, in the liquid crystal alignment pattern of the liquid crystal compound 40, the length (distance) over which the optical axis 40A of the liquid crystal compound 40 rotates by 180° in the arrow X1 direction in which the optical axis 40A changes while continuously rotating in a plane is the length Λ of the single period in the liquid crystal alignment pattern.

That is, a distance between centers of two liquid crystal compounds 40 in the arrow X1 direction is the length Λ of the single period, the two liquid crystal compounds having the same angle in the arrow X1 direction. Specifically, as shown in FIG. 6 (FIG. 7), a distance of centers in the arrow X1 direction of two liquid crystal compounds 40 in which the arrow X1 direction and the direction of the optical axis 40A match each other is the length Λ of the single period. In the following description, the length Λ of the single period will also be referred to as "single period Λ".

In the first A diffraction element 18a according to the embodiment of the present invention, in the liquid crystal alignment pattern of the cholesteric liquid crystal layer, the single period Λ is repeated in the arrow X1 direction, that is, in the one in-plane direction in which the direction of the optical axis 40A changes while continuously rotating.

Figure 5:
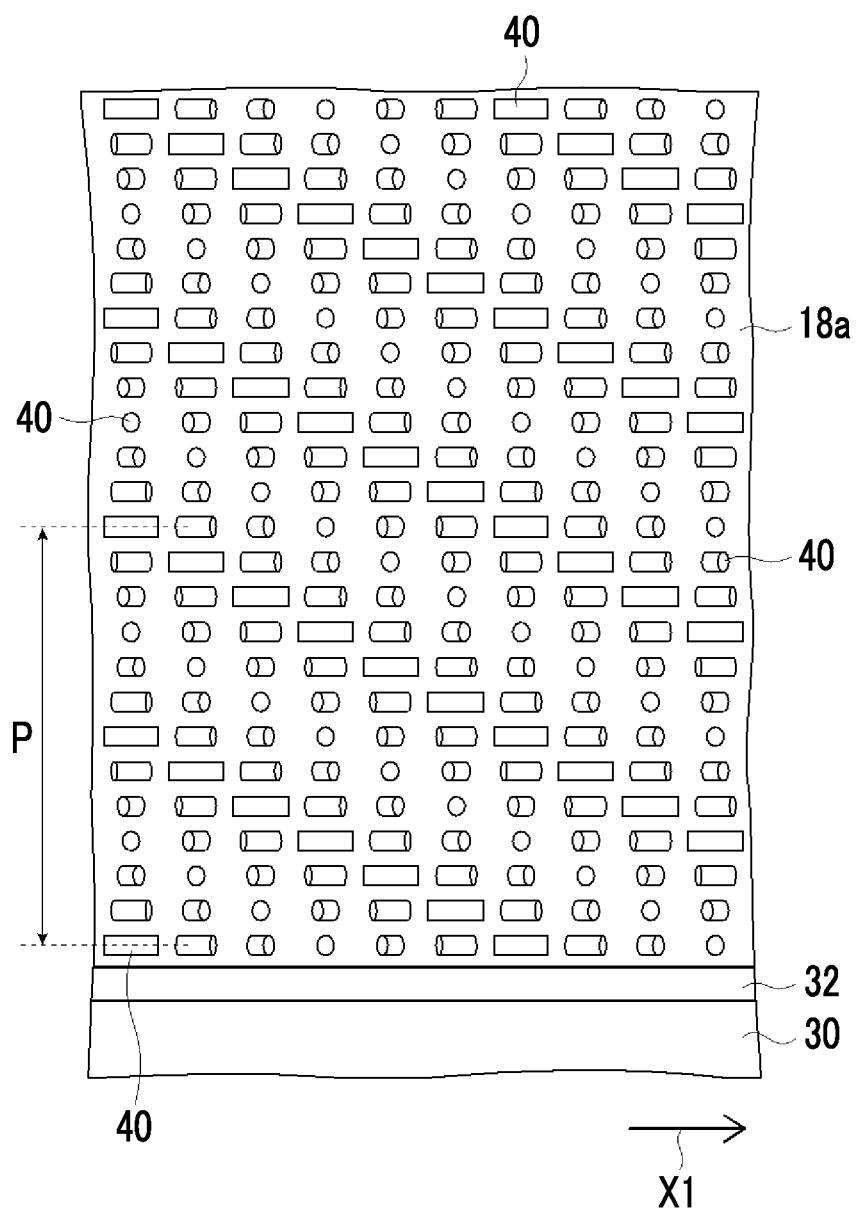
FIG. 5 is a conceptual diagram showing the first diffraction element.
Figure 17:
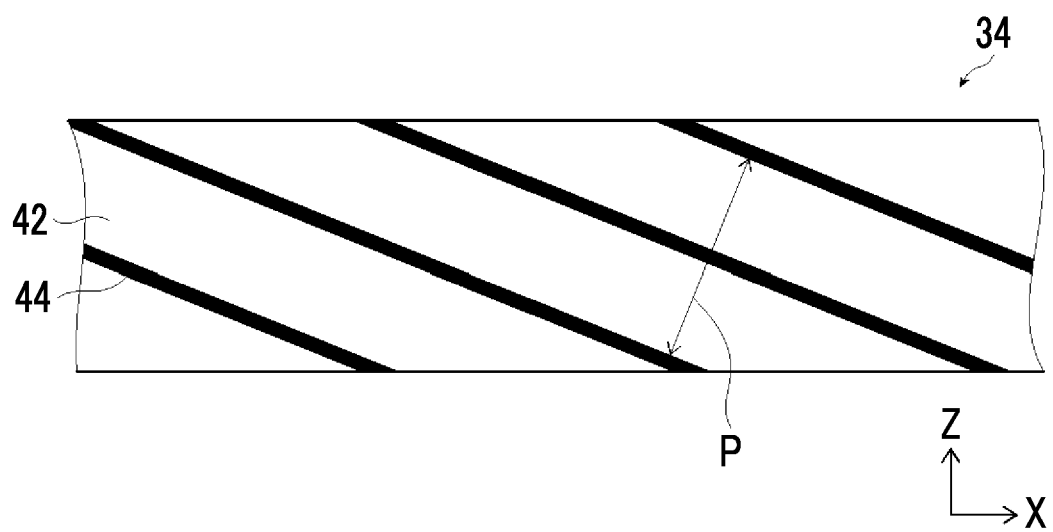
FIG. 17 is a diagram conceptually showing a cross-sectional scanning electron microscope (SEM) image of a liquid crystal layer in the first A diffraction element shown in FIG. 6.

In a case where an X-Z plane of the cholesteric liquid crystal layer 34 having the liquid crystal alignment pattern in which the direction of the optical axis 40A derived from the liquid crystal compound 40 changes while continuously rotating as in the first A diffraction element 18a shown in FIG. 5 is observed with a scanning electron microscope (SEM), a stripe pattern where an arrangement direction in which bright portions 42 and dark portions 44 are alternately arranged as conceptually shown in FIG. 17 is tilted at a predetermined angle with respect to the main surface (X-Y plane) is observed.

In the following description, the cholesteric liquid crystal layer 34 will also be referred to as "liquid crystal layer 34".

In this SEM cross-section, an interval of lines between the bright portions 42 adjacent to each other or lines between the dark portions 44 adjacent to each other in the normal direction corresponds to a ½ slope pitch. In a case where the optical axis 40A of the liquid crystal compound 40 is aligned to be parallel to the main surface (X-Y plane) of the liquid crystal layer 34, as described above, one helical pitch is the pitch P shown in FIG. 5. On the other hand, in a case where the liquid crystal compound 40 is tilted with respect to the main surface of the liquid crystal layer 34, in particular, in a case where a tilt angle of the liquid crystal compound 40 with respect to the main surface of the liquid crystal layer 34 is the same as an angle of the line between the bright portions 42 or the dark portions 44 with respect to the main surface of the liquid crystal layer 34, as indicated by P in FIG. 17, two bright portions 42 and two dark portions 44 correspond to one helical pitch (one helical turn).

Here, the example shown in FIG. 5 shows the configuration in which, on the X-Z plane of the liquid crystal layer 34, the optical axis 40A of the liquid crystal compound 40 is aligned to be parallel to the main surface (X-Y plane). However, the present invention is not limited to this configuration. For example, as shown in FIG. 18, a configuration in which, on the X-Z plane of the liquid crystal layer 34, the optical axes 40A of the liquid crystal compound 40 is aligned to be tilted with respect to the main surface (X-Y plane) may be adopted.

Figure 18:
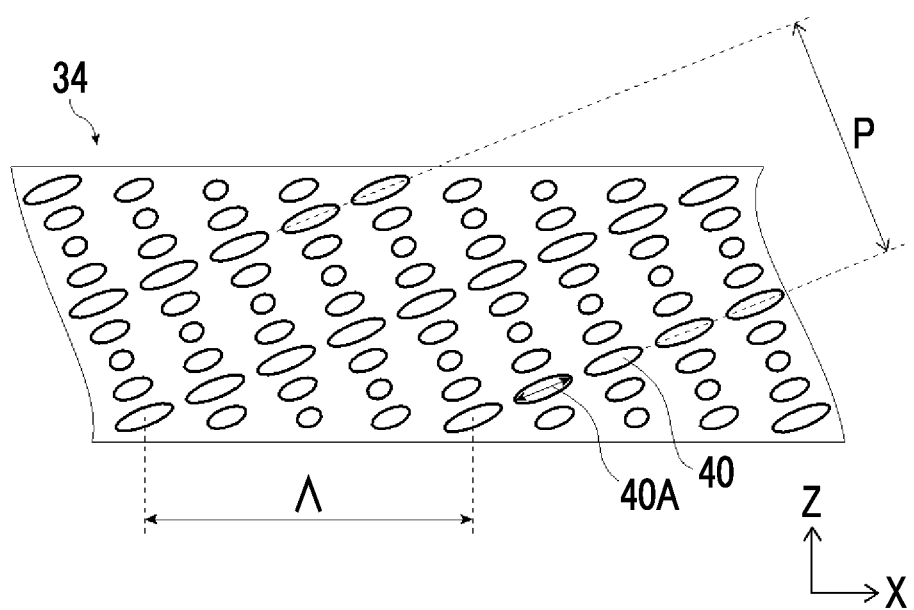
FIG. 18 is a diagram conceptually showing another example of the liquid crystal layer used as the first A diffraction element.

In addition, the example shown in FIG. 18 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 19:
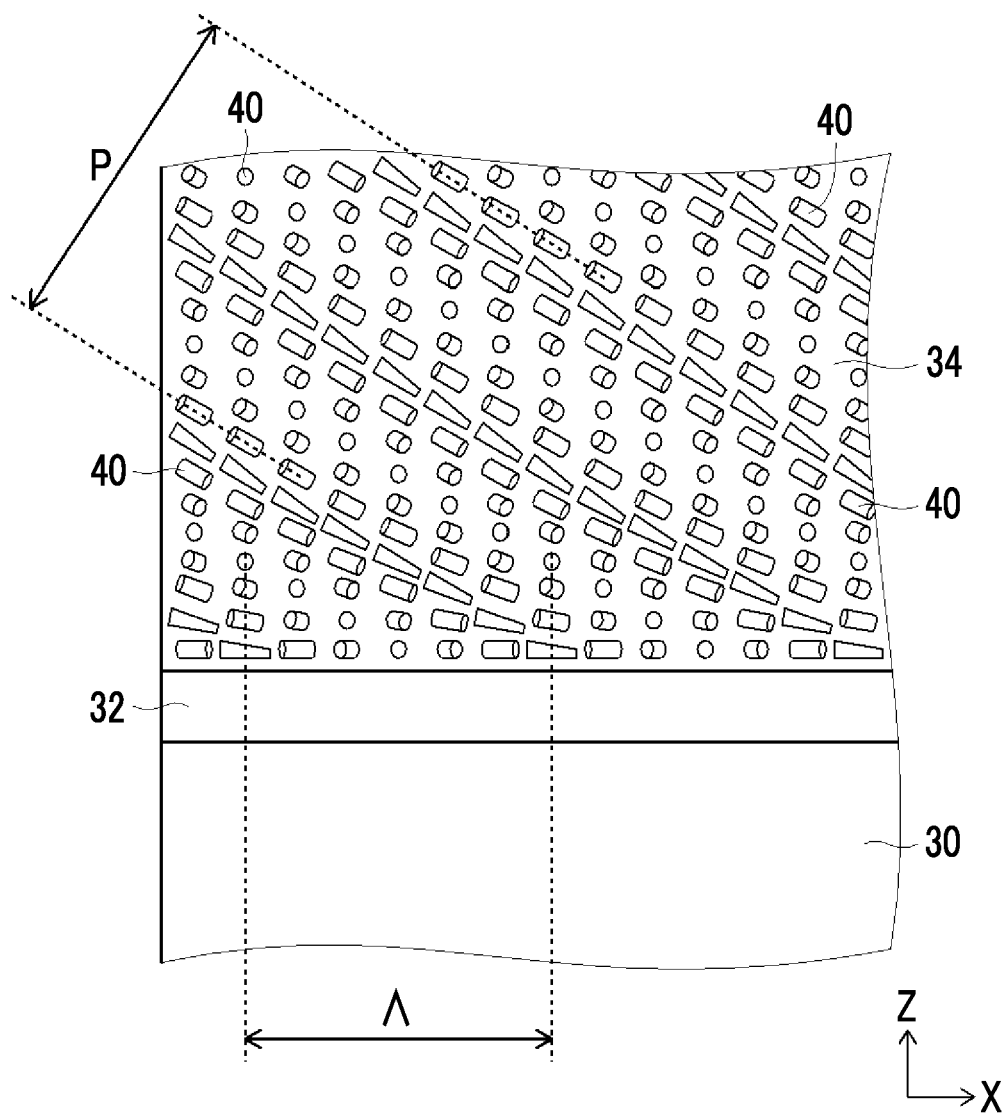
FIG. 19 is a diagram conceptually showing still another example of the liquid crystal layer used as the first A diffraction element.

For example, in an example shown in FIG. 19, the optical axis 40A of the liquid crystal compound 40 at an interface of the liquid crystal layer 34 on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer 34 may have a configuration in which the optical axis 40A of the liquid crystal compound 40 has a pretilt angle at one interface among the upper and lower interfaces or may have a pretilt angle at both of the interfaces. In addition, the pretilt angles at both of the interfaces may be different from each other.

The liquid crystal compound 40 has the tilt angle (is tilted). As a result, in a case where light is diffracted, the effective birefringence of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarizing microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarizing microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer) travels obliquely in an oblique direction in the liquid crystal layer 34 along with a bending force. In a case where light travels in the liquid crystal layer 34, diffraction loss is generated due to a deviation from conditions such as a diffraction period that are set to obtain a desired diffraction angle with respect to the vertically incident light.

In a case where the liquid crystal compound is tilted, an orientation in which a higher birefringence is generated than that in an orientation in which light is diffracted is present as compared to a case where the liquid crystal compound is not tilted. In this direction, the effective extraordinary light refractive index increases, and thus the birefringence as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer 34. By pretilting the alignment film on the support side interface, the tilt angle of the liquid crystal compound 40 can be controlled. For example, by obliquely exposing the alignment film to ultraviolet light from the front during the formation of the alignment film, the liquid crystal compound 40 in the liquid crystal layer 34 formed on the alignment film can be made to have a pretilt angle. In this case, the liquid crystal compound is pretilted in a direction in which the single axis side of the liquid crystal compound 40 can be seen with respect to the second irradiation direction. Since the liquid crystal compound 40 having an orientation in a direction perpendicular to the second irradiation direction is not pretilted, a region where the liquid crystal compound is pretilted and a region where the liquid crystal compound is not pretilted are present. This configuration is suitable for improving the diffraction efficiency because it contributes to the most improvement of birefringence in the desired orientation in a case where light is diffracted in the direction.

Further, an additive for promoting the pretilt angle can also be added to the liquid crystal layer 34 or to the alignment film. In this case, the additive can be used as a factor for further improving the diffraction efficiency.

This additive can also be used for controlling the pretilt angle on the air side interface. Here, in a cross-section of the liquid crystal layer 34 observed with a SEM, the bright portions 42 and the dark portions 44 derived from a cholesteric liquid crystalline phase are tilted with respect to the main surface. In the liquid crystal layer 34, it is preferable that, in a case where an in-plane retardation Re is measured from a direction tilted with respect to a normal direction and a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound 40 of the liquid crystal layer 34 is tilted with respect to the main surface and the tilt direction substantially matches the bright portions 42 and the dark portions 44 of the liquid crystal layer 34. The normal direction is a direction perpendicular to the main surface.

By the liquid crystal layer 34 having the above-described configuration, circularly polarized light can be diffracted with a higher diffraction efficiency than the liquid crystal layer in which the liquid crystal compound 40 is parallel to the main surface.

In the configuration in which the liquid crystal compound 40 of the liquid crystal layer 34 is tilted with respect to the main surface and the tilt direction substantially matches the bright portions 42 and the dark portions 44, bright portions and dark portions corresponding to a reflecting surface matches the optical axis 40A of the liquid crystal compound 40. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer 34, the absolute value of the tilt angle of the optical axis of the liquid crystal layer 34 is preferably 5° or more, more preferably 15° or more, and still more preferably 20° or more.

It is preferable that the absolute value of the tilt angle of the optical axis is 15° or more from the viewpoint that the direction of the liquid crystal compound 40 matches the bright portions and the dark portions more suitably such that the diffraction efficiency can be improved.

The cholesteric liquid crystal layer obtained by immobilizing a cholesteric liquid crystalline phase typically reflects incident light (circularly polarized light) by specular reflection.

On the other hand, the first A diffraction element 18a reflects incident light in a state where the light is tilted in the arrow X1 direction with respect to specular reflection. The first A diffraction element 18a has the liquid crystal alignment pattern in which the optical axis 40A changes while continuously rotating in the arrow X1 direction in a plane (the predetermined one in-plane direction). Hereinafter, the description will be made with reference to FIG. 7.

For example, the first A diffraction element 18a is a cholesteric liquid crystal layer that selectively reflects right circularly polarized light $R_R$ of red light. Accordingly, in a case where light is incident into the first A diffraction element 18a, the first A diffraction element 18a reflects only right circularly polarized light $R_R$ of red light and allows transmission of the other light.

In the first A diffraction element 18a, the optical axis 40A of the liquid crystal compound 40 changes while rotating in the arrow X1 direction (the one in-plane direction).

Further, the liquid crystal alignment pattern formed in the first A diffraction element 18a is a pattern that is periodic in the arrow X1 direction. Therefore, as conceptually shown in FIG. 17, the right circularly polarized light $R_R$ of red light incident into the first A diffraction element 18a is reflected (diffracted) in a direction corresponding to the period of the liquid crystal alignment pattern, and the reflected right circularly polarized light $R_R$ of red light is reflected (diffracted) in a direction tilted with respect to the XY plane in the arrow X1 direction. The XY plane is a main surface of the cholesteric liquid crystal layer.

Accordingly, by appropriately setting the arrow X1 direction as the one in-plane direction in which the optical axis 40A rotates, a direction in which the right circularly polarized light $R_R$ of red light is reflected (diffracted) can be adjusted.

Figure 7:
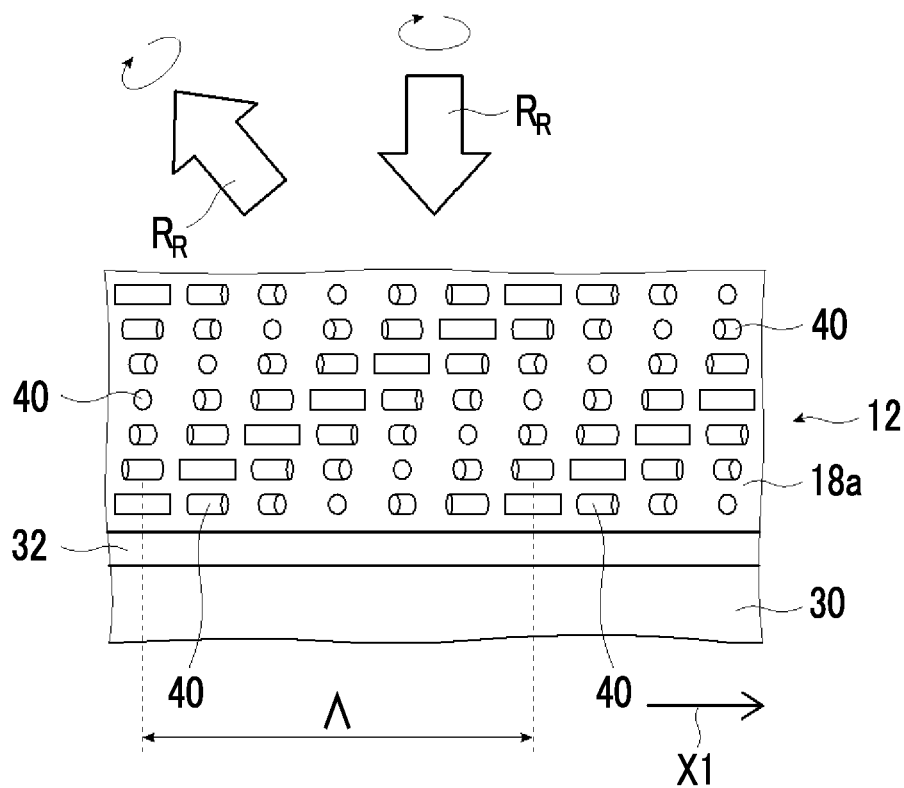
FIG. 7 is a conceptual diagram showing an action of the first A diffraction element.

That is, by reversing the arrow X1 direction, the reflection direction of the right circularly polarized light $R_R$ of red light is opposite to that of FIGS. 6 and 7.

In addition, by reversing the rotation direction of the optical axis 40A of the liquid crystal compound 40 toward the arrow X1 direction, a reflection direction of the right circularly polarized light $R_R$ of red light can be reversed.

That is, in FIGS. 4 to 7, the rotation direction of the optical axis 40A toward the arrow X1 direction is clockwise, and the right circularly polarized light $R_R$ of red light is reflected in a state where it is tilted in the arrow X1 direction. By setting the rotation direction of the optical axis 40A to be counterclockwise, the right circularly polarized light $R_R$ of red light is reflected in a state where it is tilted in a direction opposite to the arrow X1 direction.

Further, in the cholesteric liquid crystal layer having the same liquid crystal alignment pattern, the reflection direction is reversed by adjusting the helical turning direction of the liquid crystal compound 40, that is, the turning direction of circularly polarized light to be reflected.

The first A diffraction element 18a shown in FIG. 7 has a right-twisted helical turning direction, selectively reflects right circularly polarized light, and has the liquid crystal alignment pattern in which the optical axis 40A rotates clockwise in the arrow X1 direction. As a result, the right circularly polarized light is reflected in a state where it is tilted in the arrow X1 direction.

Accordingly, in the cholesteric liquid crystal layer that has a left-twisted helical turning direction, selectively reflects left circularly polarized light, and has the liquid crystal alignment pattern in which the optical axis 40A rotates clockwise in the arrow X1 direction, the left circularly polarized light is reflected in a state where it is tilted in a direction opposite to the arrow X1 direction.

In the first diffraction element 18 according to the embodiment of the present invention, the first B diffraction element 18b is formed on the first A diffraction element 18a.

As described above, the first A diffraction element 18a and the first B diffraction element 18b have the same liquid crystal alignment pattern in the plane direction. That is, the first B diffraction element 18b has the liquid crystal alignment pattern in which the optical axis 40A rotates clockwise in the arrow X1 direction as in the first A diffraction element 18a. In addition, the first B diffraction element 18b has the left-twisted helical turning direction that is opposite to that of the first A diffraction element 18A, and selectively reflects left circularly polarized light.

Accordingly, the first B diffraction element 18b reflects incident left circularly polarized light of red light in a state where the right is tilted in a direction opposite to that of the first A diffraction element 18a and the arrow X1 direction.

Figure 8:
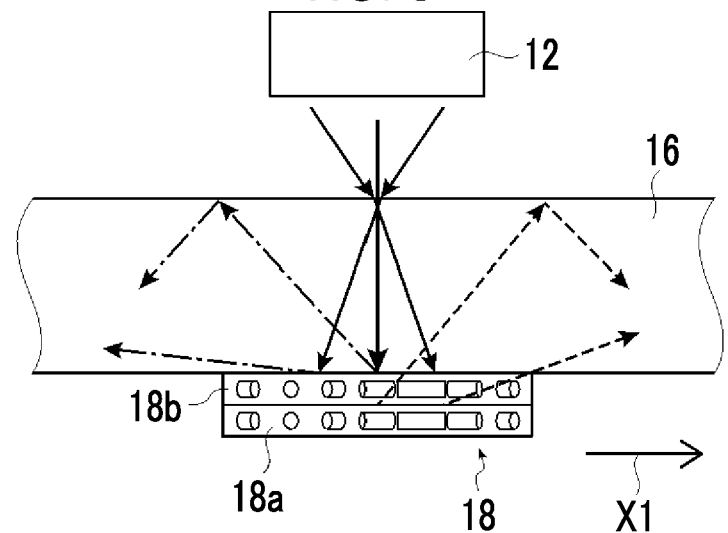
FIG. 8 is a conceptual diagram showing an action of the first diffraction element.

Accordingly, as conceptually shown in FIG. 8, among light components emitted from the display element 12, right circularly polarized light ($R_R$) of red light transmits through the light guide plate 16 the first B diffraction element 18b and is incident into the first A diffraction element 18a. The right circularly polarized light of red light incident into the first A diffraction element 18a is reflected in a state where it is tilted in the arrow X1 direction as described above and is incident into the light guide plate 16 again. The right circularly polarized light of red light incident into the light guide plate 16 again is tilted in the arrow X1 direction by the first A diffraction element 18a. Therefore, the light is totally reflected in the light guide plate 16 and propagates (is guided) in the arrow X1 direction as indicated by a broken line in FIG. 8.

On the other hand, among the light components emitted from the display element 12, left circularly polarized light of red light transmits through the light guide plate 16 and is incident into the first B diffraction element 18b.

The left circularly polarized light of red light incident into the first B diffraction element 18b is reflected in a state where it is tilted in a direction opposite to the arrow X1 direction as described above and is incident into the light guide plate 16 again. The left circularly polarized light of red light incident into the light guide plate 16 again is tilted in the direction opposite to in the arrow X1 direction by the first B diffraction element 18b. Therefore, the light is totally reflected in the light guide plate 16 and propagates (is guided) in the direction opposite to the arrow X1 direction as indicated by a chain line in FIG. 8. As shown in FIGS. 1 to 3, the second A diffraction element 20a is provided on the arrow X1 direction side of the first diffraction element 18, and the second B diffraction element 20b is provided on the side of the first diffraction element 18 opposite to the arrow X1 direction.

As described above, the second A diffraction element 20a and the second B diffraction element 20b have the same cholesteric liquid crystal layer as the first A diffraction element 18a that have the liquid crystal alignment pattern in which the optical axis 40A of the liquid crystal compound 40 continuously changes in the one in-plane direction. The second A diffraction element 20a reflects right circularly polarized light of red light, and the second B diffraction element 20b reflects left circularly polarized light of red light.

In addition, the third diffraction element 24 in which the third A diffraction element 24a and the third B diffraction element 24b are laminated in a direction perpendicular to (or intersecting with) the arrow X1 direction of the first diffraction element 18 is provided. The third A diffraction element 24a and the third B diffraction element 24b have the same cholesteric liquid crystal layer as the first A diffraction element 18a that have the liquid crystal alignment pattern in which the optical axis 40A of the liquid crystal compound 40 continuously changes in the one in-plane direction. The third A diffraction element 24a selectively reflects right circularly polarized light of red light, and the third B diffraction element 24b selectively reflects left circularly polarized light of red light.

The cholesteric liquid crystal layer of the second A diffraction element 20a has the liquid crystal alignment pattern in which the optical axis 40A of the liquid crystal compound 40 rotates clockwise in an arrow X2A direction. In the cholesteric liquid crystal layer of the second A diffraction element 20a, right circularly polarized light of red light that is reflected by the first A diffraction element 18a and propagates in the light guide plate 16 to be incident into the cholesteric liquid crystal layer of the second A diffraction element 20a from a direction intersecting with the arrow X2A direction is reflected in a state where it is tilted in a direction intersecting with the arrow X2A direction unlike the incidence direction into the cholesteric liquid crystal layer of the second A diffraction element 20a, and propagates in a direction toward the third diffraction element 24.

The cholesteric liquid crystal layer of the second B diffraction element 20b has the liquid crystal alignment pattern in which the optical axis 40A of the liquid crystal compound 40 rotates clockwise in an arrow X2B direction. In the cholesteric liquid crystal layer of the second B diffraction element 20b, left circularly polarized light of red light that is reflected by the first B diffraction element 18b and propagates in the light guide plate 16 to be incident into the cholesteric liquid crystal layer of the second B diffraction element 20b from a direction intersecting with the arrow X2B direction is reflected in a state where it is tilted in a direction intersecting with the arrow X2B direction unlike the incidence direction into the cholesteric liquid crystal layer of the second B diffraction element 20b, and propagates in a direction toward the third diffraction element 24.

The third A diffraction element 24a has the liquid crystal alignment pattern in which the optical axis 40A of the liquid crystal compound 40 rotates clockwise in an arrow X3A direction. Accordingly, the third A diffraction element 24a reflects the incident right circularly polarized light of red light in a state where it is tilted in the arrow X3A direction.

Further, the third B diffraction element 24b has the liquid crystal alignment pattern in which the optical axis 40A of the liquid crystal compound 40 rotates clockwise in an arrow X3B direction. Accordingly, the third B diffraction element 24b reflects incident left circularly polarized light of red light in a state where the light is tilted in a direction opposite to the arrow X3B direction.

The second A diffraction element 20a is provided on the arrow X1 direction side of the first diffraction element 18, and the second B diffraction element 20b is provided on the side of the first diffraction element 18 opposite to the arrow X1 direction.

In addition, the second A diffraction element 20a and the second B diffraction element 20b diffracts incident light to the third diffraction element 24.

Accordingly, among red light components (red light corresponding to an image) that are displayed by the display element 12 and are incident into the first diffraction element 18 as described above, right circularly polarized light (white arrow) that is reflected in a state where it is tilted in the arrow X1 direction propagates in the light guide plate 16, is incident into the second A diffraction element 20a, and is reflected (diffracted) in a direction intersecting with the arrow X2A direction by the second A diffraction element 20a. The right circularly polarized light of red light that is reflected (diffracted) in a direction intersecting with the arrow X2A direction by the second A diffraction element 20a propagates in the light guide plate 16, is incident into the third A diffraction element 24a, and is reflected (diffracted) in a state where it is tilted in the arrow X3A direction by the third A diffraction element 24a. As a result, the incidence angle into the interface of the light guide plate 16 is a critical angle or lower, and the light is emitted from the light guide plate 16 and is observed by the user U as shown in FIGS. 2 and 3.

On the other hand, among red light components that are displayed by the display element 12 and are incident into the first diffraction element 18 as described above, left circularly polarized light (white arrow) that is reflected in a state where it is tilted in a direction intersecting with the arrow X1 direction propagates in the light guide plate 16, is incident into the second B diffraction element 20b, and is reflected by the second B diffraction element 20b in a state where it is tilted in a direction intersecting with the arrow X2B direction. The left circularly polarized light of red light that is reflected by the second B diffraction element 20b in a state where it is tilted in the arrow X2B direction propagates in the light guide plate 16, is incident into the third B diffraction element 24b, and is reflected by the third B diffraction element 24b in a state where it is tilted in a direction intersecting with the arrow X3B direction. As a result, the incidence angle into the interface of the light guide plate 16 is a critical angle or lower, and the light is emitted from the light guide plate 16 and is observed by the user U as shown in FIGS. 2 and 3.

As described above, in the image display device according to the embodiment of the present invention including the light guide element according to the embodiment of the present invention, an image corresponding to an image is diffracted in two different directions by the first diffraction element 18. The light components that are incident into the light guide plate 16 and propagate in different paths are diffracted to the third diffraction element 24 by the second A diffraction element 20a and the second B diffraction element 20b disposed to be spaced from each other, are emitted from the light guide plate by the diffraction from the third diffraction element 24, and are observed by the user U.

Therefore, as shown in FIG. 2, the emission range to the user U can be extended with respect to the incidence range from the display element 12. By using the image display device according to the embodiment of the present invention for AR glasses or the like, the FOV can be extended.

In addition, by using the liquid crystal diffraction element for at least one of the first diffraction element 18 as the incidence portion into the light guide plate 16 or the third diffraction element 24 as the emission portion from the light guide plate 16, preferably for both of the first diffraction element 18 and the third diffraction element 24, and more preferably for all the first diffraction element 18, the second diffraction element, and the third diffraction element 24, the light use efficiency can be improved as compared to a case where a surface relief grating or the like is used, a decrease in brightness relative to the display image by the display element 12 can be prevented, and a high-brightness image can be displayed.

In the present invention, in a case where a diffraction element other than the liquid crystal diffraction element is used for one of the first diffraction element 18 or the third diffraction element 24 and the second diffraction element, all the well-known diffraction element (diffraction grating) such as a surface relief grating or a hologram diffraction element can be used as the diffraction element.

In the image display device 10 of the example shown in the drawing, as a preferable aspect, in the third A diffraction element 24a and the third B diffraction element 24b of the third diffraction element 24, the one in-plane directions in which the optical axis 40A of the liquid crystal compound 40 rotates intersect with each other. That is, in the third A diffraction element 24a and the third B diffraction element 24b of the third diffraction element 24, the arrow X3A direction and the arrow X3B direction intersect with each other.

With the above-described configuration, the incidence angle of the light propagated in different directions by the diffraction from the third diffraction element 24 can be made to be the critical angle or lower, which is preferable from the viewpoint that the emission of light from the light guide plate 16 can be favorably performed.

In addition, in the image display device 10 in the example shown in the drawing, as a preferable aspect, in the first diffraction element 18 and the third diffraction element 24, the one in-plane direction in which the optical axis 40A of the liquid crystal compound 40 rotates intersect with each other. That is, the arrow X1 direction of the first diffraction element 18, the arrow X3A direction of the third A diffraction element 24a, and the arrow X3B direction of the third B diffraction element 24b intersect with each other.

With the above-described configuration, light can be propagated from the first diffraction element 18 up to the third diffraction element 24, which is preferable from the viewpoint that the emission of light from the light guide plate 16 can be favorably performed. As described above, the cholesteric liquid crystal layer used for the first diffraction element 18, the second diffraction element, and the third diffraction element 24 has the liquid crystal alignment pattern in which the optical axis 40A of the liquid crystal compound 40 continuously rotates in the one in-plane direction. In addition, as shown in FIGS. 4, 6, and 7, in the liquid crystal alignment pattern, the length over which the optical axis 40A rotates by 180° is set as the single period A.

In the cholesteric liquid crystal layer having the liquid crystal alignment pattern, as the single period A decreases, the angle of reflected light with respect to the above-described incidence light increases. That is, as the single period A decreases, reflected light can be reflected in a state where it is largely tilted with respect to incidence light.

For example, assuming that the single period of the first diffraction element 18 (the first A diffraction element 18a and the first B diffraction element 18b) is represented by $\Lambda 1$, the single period of the second diffraction element (the second A diffraction element 20a and the second B diffraction element 20b) is represented by $\Lambda 2$, and the single period of the third diffraction element 24 (the third A diffraction element 24a and the third B diffraction element 24b) is represented by $\Lambda 3$, in a case where $\Lambda 1 < \Lambda 2 < \Lambda 3$, the first diffraction element 18 reflects reflected light in a state where the light is most largely tilted, and the tilt from the third diffraction element 24 in the reflection direction is smallest.

In addition, as shown in FIG. 1, in the image display device 10, in the first diffraction element 18, the second diffraction element, and the third diffraction element 24, the one in-plane directions in which the optical axis 40A of the liquid crystal compound 40 rotates intersect with each other. That is, the arrow X1 direction of the first diffraction element 18, the arrow X2A direction of the second A diffraction element, and the arrow X3A direction of the third A diffraction element 24a intersect with each other, and the arrow X1 direction of the first diffraction element 18, the arrow X2B direction of the second B diffraction element, and the arrow X3B direction intersect with each other.

In the present invention, it is preferable that all the first diffraction element 18, the second diffraction element, and the third diffraction element 24 are formed of the liquid crystal diffraction element, in the image display device 10, in the first diffraction element 18, the second diffraction element, and the third diffraction element 24, the one in-plane directions in which the optical axis 40A of the liquid crystal compound 40 rotates intersect with each other, and the single period $\Lambda 2$ of the second diffraction element is less than the single period $\Lambda 1$ of the first diffraction element 18 and the single period $\Lambda 3$ of the third diffraction element 24. That is, it is preferable that $\Lambda 2 < \Lambda 1$ and $\Lambda 2 < \Lambda 3$ are satisfied and the degree of tilt of reflected light from the second diffraction element is more than that of reflected light from the first diffraction element 18 and the third diffraction element 24.

With the above-described configuration, light can be propagated from the first diffraction element 18 up to the third diffraction element 24, which is preferable from the viewpoint of improving light use efficiency.

The single period $\Lambda 1$ of the first diffraction element 18, the single period $\Lambda 2$ of the second diffraction element, and the single period $\Lambda 3$ of the third diffraction element 24 are not limited and may be appropriately set depending on the positional relationship between the respective diffraction elements and the like.

The single period $\Lambda 1$ of the first diffraction element 18, the single period $\Lambda 2$ of the second diffraction element, and the single period $\Lambda 3$ of the third diffraction element 24 are preferably 1 μm or less, more preferably 0.8 μm or less, and still more preferably a wavelength λ or less of incident light from the viewpoint of propagating light in the light guide plate 16 by total reflection.

In addition, the positional relationship between the first diffraction element 18, the second diffraction element (the second A diffraction element 20a and the second B diffraction element 20b), and the third diffraction element 24 and the one in-plane directions in which the optical axis 40A of the liquid crystal compound 40 rotates in the respective diffraction elements, that is, the arrow X1 direction, the arrow X2A direction, the arrow X2B direction, the arrow X3A direction, and the arrow X3B direction are not particularly limited.

That is, the positional relationship between the respective diffraction elements and the one in-plane directions in which the optical axis 40A of the liquid crystal compound 40 rotates in the respective diffraction elements may be appropriately set such that light can be appropriately propagated from the first diffraction element 18 to the third diffraction element 24 through the second A diffraction element 20*a* and the second B diffraction element 20*b* by diffraction from the respective diffraction elements.

In the image display device 10, in the first A diffraction element 18*a* and the first B diffraction element 18*b* of the first diffraction element 18, the helical turning directions, that is, the turning directions of circularly polarized light to be reflected are opposite to each other, and the one in-plane directions in which the optical axis 40A of the liquid crystal compound 40 rotates are the same (arrow X1 direction). However, the present invention is not limited to this configuration.

For example, in the first A diffraction element 18*a* and the first B diffraction element 18*b* of the first diffraction element 18, the helical turning directions, that is, the turning directions of circularly polarized light to be reflected may be the same, and the one in-plane directions in which the optical axis 40A of the liquid crystal compound 40 rotates (clockwise) may be opposite to each other. That is, in the first A diffraction element 18*a* and the first B diffraction element 18*b* of the first diffraction element 18, the turning directions of circularly polarized light to be reflected may be the same, and the one in-plane directions in which the optical axis 40A of the liquid crystal compound 40 rotates may be the arrow X1 direction and the direction opposite to the arrow X1 direction. In other words, in the first A diffraction element 18*a* and the first B diffraction element 18*b*, the helical turning directions, that is, the turning directions of circularly polarized light to be reflected may be the same, and the rotation directions of the optical axis 40A of the liquid crystal compound 40 in the arrow X1 direction may be clockwise or counterclockwise.

In a case where the one in-plane directions in which the optical axis 40A of the liquid crystal compound 40 rotates are opposite to each other, the reflection directions of circularly polarized light from the cholesteric liquid crystal layer are also opposite to each other.

For example, the first A diffraction element 18*a* and the first B diffraction element 18*b* reflect right circularly polarized light, the one in-plane direction in which the optical axis 40A rotates in the first A diffraction element 18*a* is the arrow X1 direction, and the one in-plane direction in which the optical axis 40A rotates in the first B diffraction element 18*b* is the direction opposite to the arrow X1 direction. In this case, the right circularly polarized light of red light that is displayed by the display element 12 and transmits through the light guide plate 16 is reflected by the first B diffraction element 18*b* in a state where it is tilted in a direction opposite to the arrow X1 direction, and the right circularly polarized light of red light transmitted without being reflected from the first B diffraction element 18*b* is reflected by the first A diffraction element 18*a* in a state where it is tilted in the arrow X1 direction.

In a case where the turning directions of circularly polarized light to be reflected from the first A diffraction element 18*a* and the first B diffraction element 18*b* of the first diffraction element 18 are the same, it is preferable that the helical turning directions, that is, the turning directions of circularly polarized light to be reflected in the cholesteric liquid crystal layer of the second diffraction element and the third A diffraction element 24*a* and the third B diffraction element 24*b* of the third diffraction element 24 also match that of the first diffraction element 18.

Further, in a case where the turning directions of circularly polarized light to be reflected from the first A diffraction element 18*a* and the first B diffraction element 18*b* of the first diffraction element 18 are the same, it is preferable that the display element 12 emits circularly polarized light.

In addition, in a case where the one in-plane directions in which the optical axis 40A rotates in the first A diffraction element 18*a* and the first B diffraction element 18*b* are different from each other, the one in-plane directions in which the optical axis 40A rotates in the first A diffraction element 18*a* and the first B diffraction element 18*b* are not limited to being opposite to each other as described above. That is, in a case where the one in-plane directions in which the optical axis 40A rotates in the first A diffraction element 18*a* and the first B diffraction element 18*b* are different from each other, the one in-plane directions in which the optical axis 40A rotates in the first A diffraction element 18*a* and the first B diffraction element 18*b* may intersect with each other.

In addition, the first diffraction element may diffract incident light in three or more different directions. In this case, it is preferable that the same number of second diffraction elements as the number of diffraction directions from the first diffraction element are provided.

In addition, in the image display device 10, the helical turning directions, that is, the turning directions of circularly polarized light to be reflected in the first A diffraction element 18*a*, the second A diffraction element 20*a*, and the third A diffraction element 24*a* match each other. However, the present invention is not limited to this configuration. Likewise, in the image display device 10, the helical turning directions, that is, the turning directions of circularly polarized light to be reflected in the first B diffraction element 18*b*, the second B diffraction element 20*b*, and the third B diffraction element 24*b* match each other. However, the present invention is not limited to this configuration.

In a case where light propagates (total reflection) in the light guide plate 16, the polarization state may vary before and after the total reflection. Therefore, the helical turning directions, that is, the turning directions of circularly polarized light to be reflected in the first A diffraction element 18*a*, the second A diffraction element 20*a*, and the third A diffraction element 24*a* may be different from each other. Likewise, the helical turning directions, that is, the turning directions of circularly polarized light to be reflected in the first B diffraction element 18*b*, the second B diffraction element 20*b*, and the third B diffraction element 24*b* may be different from each other.

In the examples shown in FIGS. 1 to 3, the first A diffraction element 18*a* and the first B diffraction element 18*b* of the first diffraction element 18 are laminated. However, the present invention is not limited to this configuration.

Figure 9:
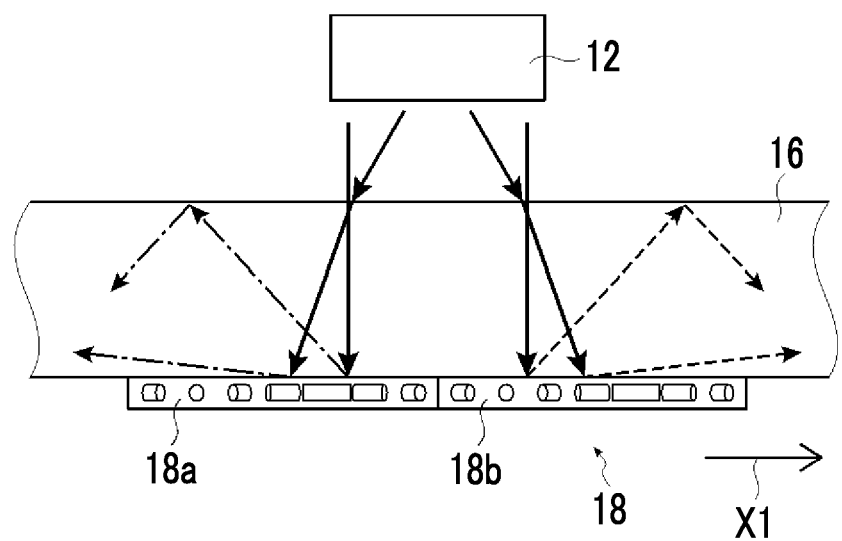
FIG. 9 is a conceptual diagram showing another action of the first diffraction element.

That is, in the image display device (light guide element) according to the embodiment of the present invention, the first A diffraction element 18*a* and the first B diffraction element 18*b* of the first diffraction element 18 may be provided at different positions in the plane direction of the light guide plate 16 as conceptually shown in FIG. 9. In this case, the first A diffraction element 18*a* and the first B diffraction element 18*b* may be provided in contact with each other or to be spaced from each other.

Regarding this point, the same is applicable to the third diffraction element 24 including the third A diffraction element 24a and the third B diffraction element 24b.

In addition, even in the configuration in which the first A diffraction element 18a and the first B diffraction element 18b of the first diffraction element 18 are provided at different positions in the plane direction of the light guide plate 16, for example, as described above, the configuration can be used in which, in the first A diffraction element 18a and the first B diffraction element 18b of the first diffraction element 18, the helical turning directions, that is, the turning directions of circularly polarized light to be reflected are opposite to each other, and the one in-plane directions in which the optical axis 40A of the liquid crystal compound 40 rotates are the same (arrow X1 direction).

Further, as another configuration in which the first A diffraction element 18a and the first B diffraction element 18b of the first diffraction element 18 are provided at different positions in the plane direction of the light guide plate 16, the configuration can be used in which, in the first A diffraction element 18a and the first B diffraction element 18b of the first diffraction element 18, the helical turning directions, that is, the turning directions of circularly polarized light to be reflected are the same, and the one in-plane directions in which the optical axis 40A of the liquid crystal compound 40 rotates (clockwise) are opposite to each other. That is, the configuration can also be used in which, in the first A diffraction element 18a and the first B diffraction element 18b, the turning directions of circularly polarized light to be reflected are the same, and the one in-plane directions in which the optical axis 40A of the liquid crystal compound 40 rotates are the arrow X1 direction and the direction opposite to the arrow X1 direction.

Even in the configuration in which the first A diffraction element 18a and the first B diffraction element 18b of the first diffraction element 18 are provided at different positions in the plane direction of the light guide plate 16, as conceptually shown in FIG. 9, as in the above-described example, for example, incidence light emitted from the display element 12 is diffracted by the first diffraction element 18 in the arrow X1 direction and the direction opposite to the arrow X1 direction to be incident into the light guide plate, and the circularly polarized light components of red light propagated in two different directions propagate from the second A diffraction element 20a and the second B diffraction element 20b to the third diffraction element 24 and are emitted from the light guide plate 16. As a result, the FOV of AR glasses or the like can be extended. In an example shown in FIG. 9, two display devices are provided such that light components emitted from the different display devices may be incident into the first A diffraction element 18a and the first B diffraction element 18b.

The image display device 10 corresponds to the display of a monochrome image (in the example shown in the drawing, a red image) and includes one first diffraction element 18, one second diffraction element (the second A diffraction element 20a and the second B diffraction element 20b), and one third diffraction element 24, but the present invention is not limited thereto.

That is, the image display device (light guide element) according to the embodiment of the present invention may correspond to a color image and may include two or more first diffraction elements, two or more second diffraction elements, and two or more third diffraction elements.

Figure 10:
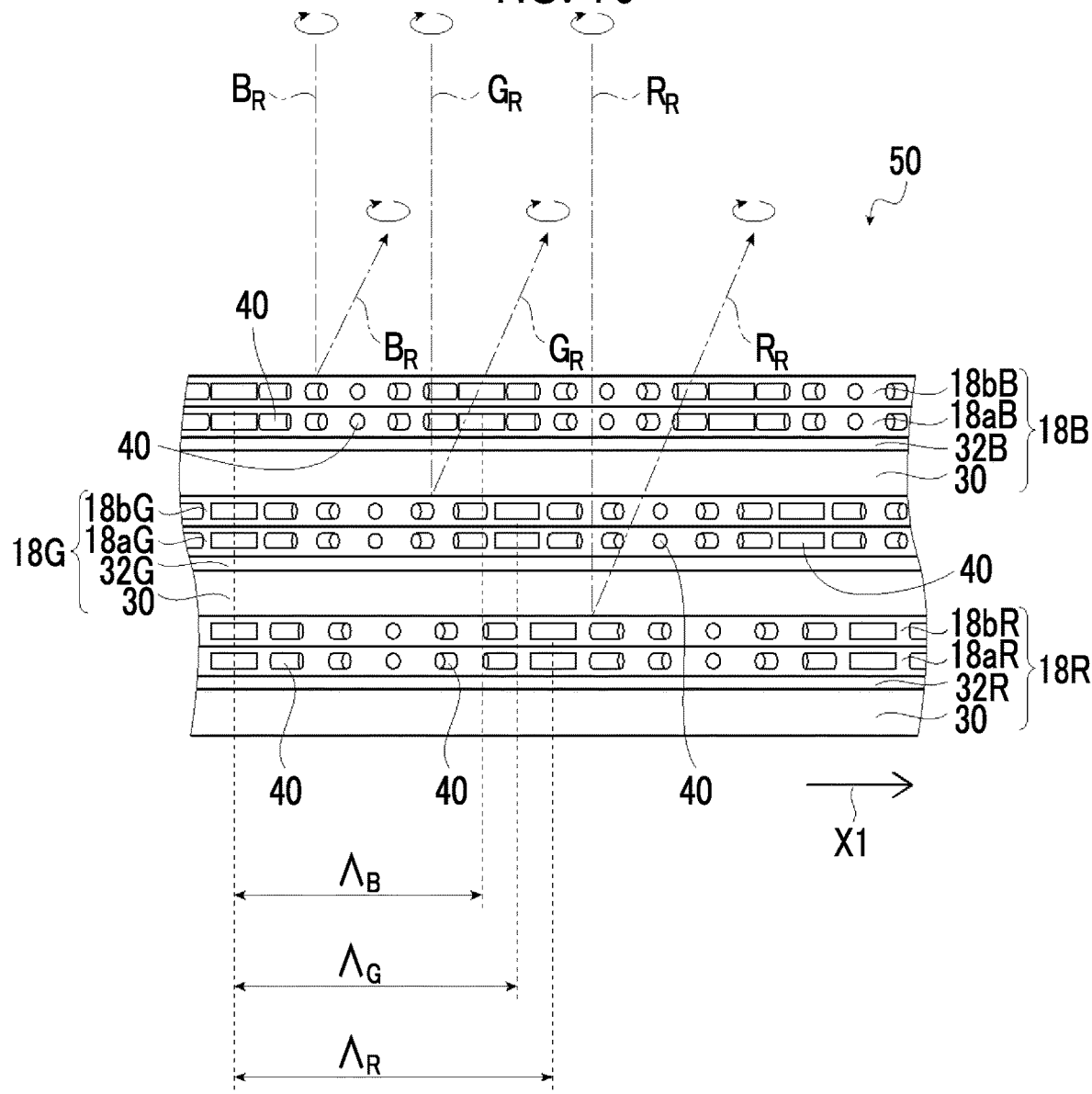
FIG. 10 is a diagram conceptually showing another example of the first diffraction element.

FIG. 10 shows an example of the first diffraction element.

In the following description, the same is applicable to the second diffraction element and the third diffraction element.

A first diffraction element 50 conceptually shown in FIG. 10 includes three diffraction elements including a R first diffraction element 18R, a G first diffraction element 18G, and a B first diffraction element 18B.

The R first diffraction element 18R corresponds to red light and includes the support 30, an alignment film 32R, a first A diffraction element 18aR that reflects right circularly polarized light of red light, and a first B diffraction element 18bR that reflects left circularly polarized light of red light.

The G first diffraction element 18G corresponds to green light and includes the support 30, an alignment film 32G, a first A diffraction element 18aG that reflects right circularly polarized light of green light, and a first B diffraction element 18bG that reflects left circularly polarized light of green light.

The B first diffraction element 18B corresponds to blue light and includes the support 30, an alignment film 32B, a first A diffraction element 18aB that reflects right circularly polarized light of blue light, and a first B diffraction element 18bB that reflects left circularly polarized light of blue light.

In the R first diffraction element 18R, the G first diffraction element 18G, and the B first diffraction element 18B, all of the support, the alignment film, and the diffraction element (cholesteric liquid crystal layer) are the same as the support 30, the alignment film 32, the first A diffraction element 18a, and the first B diffraction element 18b of the first diffraction element 18. In this case, each of the diffraction elements, that is, the cholesteric liquid crystal layer has the helical pitch P corresponding to the wavelength range where light is selectively reflected.

Here, in the R first diffraction element 18R, the G first diffraction element 18G, and the B first diffraction element 18B, a permutation of the lengths of the selective reflection center wavelengths of the diffraction elements (cholesteric liquid crystal layers) and a permutation of the lengths of the single periods A in the liquid crystal alignment patterns of the cholesteric liquid crystal layers are the same as each other.

That is, in the first diffraction element 50, the selective reflection center wavelength of the R first diffraction element 18R corresponding to reflection of red light is the longest, the selective reflection center wavelength of the G first diffraction element 18G corresponding to reflection of green light is the second longest, and the selective reflection center wavelength of the B first diffraction element 18B corresponding to reflection of blue light is the shortest.

Accordingly, in the R first diffraction element 18R, the G first diffraction element 18G, and the B first diffraction element 18B, the single period $\Lambda_R$ of the cholesteric liquid crystal layer of the R first diffraction element 18R is the longest, the single period $\Lambda_G$ of the cholesteric liquid crystal layer of the G first diffraction element 18G is the second longest, and the single period $\Lambda_B$ of the cholesteric liquid crystal layer of the B first diffraction element 18B is the shortest.

A reflection angle of light from the cholesteric liquid crystal layer in which the optical axis 40A of the liquid crystal compound 40 continuously rotates in the one in-plane direction (arrow X1 direction) varies depending on wavelengths of light to be reflected. Specifically, as the wavelength of light increases, the angle of reflected light with respect to incidence light increases. Accordingly, red light reflected from the R first diffraction element 18R has the largest angle of reflected light with respect to incidence light, green light reflected from the G first diffraction element 18G has the second largest angle of reflected light with respect to incidence light, and blue light reflected from the B first diffraction element 18B has the smallest angle of reflected light with respect to incidence light.

On the other hand, as described above, in the cholesteric liquid crystal layer having the liquid crystal alignment pattern in which the optical axis 40A of the liquid crystal compound 40 rotates in the one in-plane direction, as the single period A over which the optical axis 40A in the liquid crystal alignment pattern rotates by 180° decreases, the angle of reflected light with respect to incidence light increases.

In the R first diffraction element 18R, the G first diffraction element 18G, and the B first diffraction element 18B, the permutation of the lengths of the selective reflection center wavelengths of the diffraction elements (cholesteric liquid crystal layers) and the permutation of the lengths ($\Lambda_R$, $\Lambda_G$, and $\Lambda_B$) of the single periods A in the liquid crystal alignment patterns are the same as each other. Thus, as shown in FIG. 10 using the right circularly polarized light $R_R$ of red light, the right circularly polarized light $G_R$ of green light, and the right circularly polarized light $B_R$ of blue light as an example, the wavelength dependence on the reflection angle of light reflected from the first diffraction element 50 is significantly reduced, and light components having different wavelengths can be reflected substantially in the same direction.

As a result, even in a case where a full color image is displayed by red light, green light, and blue light, the light can be guided to the light guide plate without a deviation in reflection angle at each wavelength, and a full color image can be displayed with a wide visual field.

As described above, in a case where the X-Z plane of the cholesteric liquid crystal layer 34 shown in FIG. 17 is observed with a SEM, a stripe pattern where the arrangement direction in which the bright portions 42 and the dark portions 44 are alternately arranged is tilted at a predetermined angle with respect to the main surface (X-Y plane) is observed. In this SEM cross-section, an interval of lines between the bright portions 42 adjacent to each other or lines between the dark portions 44 adjacent to each other in the normal direction corresponds to a ½ slope pitch.

In a case where slope pitches in the R first diffraction element 18R, the G first diffraction element 18G, and the B first diffraction element 18B (cholesteric liquid crystal layers) are represented by $Pt_R$, $Pt_G$, and $Pt_B$, respectively, it is preferable that the slope pitches and the single periods A of the liquid crystal alignment patterns satisfy the following expression.

$$\Lambda_B < \Lambda_G < \Lambda_R \text{ and } Pt_B < Pt_G < Pt_R$$

By satisfying the above-described relationship, as shown in FIG. 10 using the right circularly polarized light $R_R$ of red light, the right circularly polarized light $G_R$ of green light, and the right circularly polarized light $B_R$ of blue light as an example, the wavelength dependence on the reflection angle of light reflected from the first diffraction element 50 is significantly reduced, light components having different wavelengths can be reflected substantially in the same direction, and light components having different wavelengths to be reflected from the first diffraction element 50 can be efficiently reflected.

In a case where diffraction elements having different wavelength ranges where light is selectively reflected are laminated, the laminating order is not limited.

In a case where diffraction elements having different wavelength ranges where light is selectively reflected are laminated, it is preferable that the diffraction elements are laminated such that the wavelength in the wavelength range where light is selectively reflected sequentially increases. As a result, by setting the side where the selective reflection center wavelength is the shortest as the light incidence side, the effect of blue shift can be reduced.

In the present invention, in a case where a plurality of first diffraction elements 18 are provided, the configuration including the R first diffraction element 18R, the G first diffraction element 18G, and the B first diffraction element 18B as shown in FIG. 8 is not particularly limited.

For example, the first diffraction element 18 may include two layers appropriately selected from the R first diffraction element 18R, the G first diffraction element 18G, and the B first diffraction element 18B. Further, instead of one or more selected from the R first diffraction element 18R, the G first diffraction element 18G, and the B first diffraction element 18B, or in addition to the R first diffraction element 18R, the G first diffraction element 18G, and the B first diffraction element 18B, the first diffraction elements 18 may include a reflecting laminate that selectively reflects ultraviolet light and/or a reflecting laminate that selectively reflects infrared light.

Alternatively, in a case where a wavelength range of visible light is divided into two wavelength ranges, the first diffraction element 18 may include a S first diffraction element 18S that selectively reflects short wavelength side light and an L first diffraction element 18L that selectively reflects long wavelength side light among the two wavelength ranges. Further, instead of the S first diffraction element 18S and the L first diffraction element 18L or in addition to the S first diffraction element 18S and the L first diffraction element 18L, the first diffraction elements 18 may include a reflecting laminate that selectively reflects ultraviolet light and/or a reflecting laminate that selectively reflects infrared light.

In the present invention, in a case where a plurality of first diffraction elements are provided, as in the example shown in FIG. 10, a configuration where the first diffraction elements are laminated is not limited.

For example, a configuration in which the R first diffraction element 18R, the G first diffraction element 18G, and the B first diffraction element 18B are provided at different positions in the plane direction of the light guide plate may be used. Alternatively, a configuration in which a light guide plate for an R image, a light guide plate for a G image, and a light guide plate for a B image are provided, diffraction elements for corresponding colors are provided on the respective light guide plates, and the light guide plates are laminated can also be used. Alternatively, a configuration where a light guide plate for two colors and a light guide plate for one color are laminated, for example, a configuration in which a light guide plate for an R image and a G image, and a light guide plate for a B image are provided and diffraction elements for corresponding colors are provided on the respective light guide plates can also be used.

In any of configurations including a case where a liquid crystal diffraction element other than the cholesteric liquid crystal layer described below is used, it is preferable that a liquid crystal diffraction element corresponding to red light has the longest single period A in the liquid crystal alignment pattern and a liquid crystal diffraction element corresponding to blue light has the shortest single period A in the liquid crystal alignment pattern.

In addition, in the present invention, in a case where a plurality of first diffraction elements are provided, for example, a configuration in which the S first diffraction element 18S and the L first diffraction element 18L are provided at different positions in the plane direction of the light guide plate may be used. Alternatively, a configuration in which a light guide plate for an image for a short wavelength side image and a light guide plate for a long wavelength side image are provided, diffraction elements for corresponding colors are provided on the respective light guide plates, and the light guide plates are laminated can also be used.

In any of configurations including a case where a liquid crystal diffraction element other than the cholesteric liquid crystal layer described below is used, it is preferable that a liquid crystal diffraction element corresponding to long wavelength side light has the longest single period A in the liquid crystal alignment pattern, and a liquid crystal diffraction element corresponding to a short wavelength side light has the shortest single period A in the liquid crystal alignment pattern.

Accordingly, In the S first diffraction element 18S and the L first diffraction element 18L, a permutation of the lengths of the selective reflection center wavelengths of the diffraction elements (cholesteric liquid crystal layers (liquid crystal layers 34)) and a permutation of the lengths ($\Lambda_S$ and $\Lambda_L$) of the single periods A in the liquid crystal alignment patterns are the same as each other. Thus, in the right circularly polarized light $S_R$ on the short wavelength side and the right circularly polarized light $L_R$ of the long wavelength side, the wavelength dependence on the reflection angle of light reflected from the first diffraction element 50 is significantly reduced, and light components having different wavelengths can be reflected substantially in the same direction.

As a result, even in a case where a full color image is displayed by the short wavelength side light and the long wavelength side light, the light can be guided to the light guide plate without a deviation in reflection angle at each wavelength, and a full color image can be displayed with a wide visual field.

In addition, in a SEM cross-section, in a case where slope pitches in the S first diffraction element 18S and the L first diffraction element 18L (cholesteric liquid crystal layers) are represented by $Pt_S$ and $Pt_L$, respectively, it is preferable that $$\Lambda_S < \Lambda_L \text{ and } Pt_S < Pt_L$$

are satisfied.

By satisfying the above-described relationship, regarding the right circularly polarized light SR on the short wavelength side and the right circularly polarized light LR on the long wavelength side, the wavelength dependence on the reflection angle of light reflected from the first diffraction element 50 is significantly reduced, light components having different wavelengths can be reflected substantially in the same direction, and light components having different wavelengths to be reflected from the first diffraction element 50 can be efficiently reflected.

In the present invention, during the observation of the X-Z plane of the cholesteric liquid crystal layer (liquid crystal layer 34) with a SEM, in a case where an interval of lines between the bright portions 42 adjacent to each other or lines between the dark portions 44 adjacent to each other in the normal direction is represented by an ½ slope pitch, it is preferable that a cholesteric liquid crystal layer having a region where the slope pitch of the cholesteric liquid crystal layer varies depending on positions in the thickness direction is used.

By using the cholesteric liquid crystal layer having a region where the slope pitch of the cholesteric liquid crystal layer varies depending on positions in the thickness direction, light components incident at different angles can be efficiently reflected.

For example, in a case where red light components are incident into the R first diffraction element 18R at different angles, the wavelength range of light that is selectively reflected varies depending on the incidence angle. Therefore, the diffraction efficiency of reflected light may decrease depending on the angle where the light is incident. By using the cholesteric liquid crystal layer having a region where the slope pitch of the cholesteric liquid crystal layer varies depending on positions in the thickness direction, the wavelength range of light that is selectively reflected can be extended, that is, light components incident at different angles can be efficiently reflected, and a bright image having a wide field of view can be displayed.

Further, by using a cholesteric liquid crystal layer having a region where the slope pitch continuously increases or decreases in one direction of the thickness direction of the cholesteric liquid crystal layer, light incident at various incidence angles can be efficiently reflected.

In a case where a tilt angle of a line between bright portions or dark portions with respect to the main surface of the liquid crystal layer in a cross-section of the cholesteric liquid crystal layer observed with a SEM is represented by $\theta_{hp}$, by using the cholesteric liquid crystal layer having the region where the tilt angle $\theta_{hp}$ varies depending on positions in the thickness direction, light components incident at different angles can be efficiently reflected.

Further, by using a cholesteric liquid crystal layer having a region where the tilt angle $\theta_{hp}$ continuously increases or decreases in one direction of the thickness direction of the cholesteric liquid crystal layer, light incident at various incidence angles can be efficiently reflected.

In the above-described example, the R first diffraction element 18R that selectively reflects red light has been described. However, the same is also applicable to the G first diffraction element 18G that selectively reflects green light and the B first diffraction element 18B that selectively reflects blue light, and the same is applicable to the configuration, in a case where a wavelength range of visible light is divided into two wavelength ranges, the S first diffraction element 18S that selectively reflects short wavelength side light and the L first diffraction element 18L that selectively reflects long wavelength side light among the two wavelength ranges are provided.

In addition, in the configuration including the R first diffraction element 18R that selectively reflects red light, the G first diffraction element 18G that selectively reflects green light, and the B first diffraction element 18B that selectively reflects blue light, in a case where the cholesteric liquid crystal layer having the region where the slope pitch of the cholesteric liquid crystal layer varies depending on positions in the thickness direction is used, and in a case where the average values of slope pitches of the cholesteric liquid crystal layers in the thickness direction of the R first diffraction element 18R, the G first diffraction element 18G, and the B first diffraction element 18B (cholesteric liquid crystal layers) are represented by $Pt_{Ra}$, $Pt_{Ga}$, and $Pt_{Ba}$, respectively, it is preferable that the average values of the slope pitches and the single periods A of the liquid crystal alignment patterns satisfy the following expression.

$$\Lambda_B < \Lambda_G < \Lambda_R \text{ and } Pt_{Ba} < Pt_{Ga} < Pt_{Ra}$$

By satisfying the above-described relationship, in a case where the right circularly polarized light $R_R$ of red light, the right circularly polarized light $G_R$ of green light, and the right circularly polarized light $B_R$ of blue light are reflected from the first diffraction element 18, the light components having different wavelengths can be efficiently reflected.

In the configuration, in a case where a wavelength range of visible light is divided into two wavelength ranges, the S first diffraction element 18S that selectively reflects short wavelength side light and the L first diffraction element 18L that selectively reflects long wavelength side light among the two wavelength ranges are provided, in a case where the cholesteric liquid crystal layer having the region where the slope pitch of the cholesteric liquid crystal layer varies depending on positions in the thickness direction is used, and in a case where the average values of slope pitches of the cholesteric liquid crystal layers in the thickness direction of the S first diffraction element 18S and the L first diffraction element 18L are represented by $Pt_{Sa}$ and $PT_{La}$, respectively, it is preferable that the average values of the slope pitches and the single periods A of the liquid crystal alignment patterns satisfy the following expression $\Lambda_S < \Lambda_L$ and $Pt_{Sa} < Pt_{La}$.

By satisfying the above-described relationship, in a case where the right circularly polarized light $S_R$ on the short wavelength side and the right circularly polarized light $L_R$ on the long wavelength side are reflected from the first diffraction element 18, the light components having different wavelengths can be efficiently reflected.

In the present invention, during the observation of the X-Z plane of the cholesteric liquid crystal layer (liquid crystal layer 34) with a scanning electron microscope (SEM), in a case where an interval of lines between the bright portions 42 adjacent to each other or lines between the dark portions 44 adjacent to each other in the normal direction is represented by an ½ slope pitch, a configuration in which layers having different slope pitches of the cholesteric liquid crystal layers are laminated can also be preferably used.

By using the configuration in which layers having different slope pitches of the cholesteric liquid crystal layers are laminated, light components incident at different angles can be efficiently reflected.

For example, in a case where red light components are incident into the R first diffraction element 18R at different angles, the wavelength range of light that is selectively reflected varies depending on the incidence angle. Therefore, the diffraction efficiency of reflected light may decrease depending on the angle where the light is incident. By using the configuration in which layers having different slope pitches of the cholesteric liquid crystal layers are laminated, the wavelength range of light that is selectively reflected can be extended, that is, light components incident at different angles can be efficiently reflected, and a bright image having a wide field of view can be displayed.

In the above-described example, the R first diffraction element 18R that selectively reflects red light has been described. However, the same is also applicable to the G first diffraction element 18G that selectively reflects green light and the B first diffraction element 18B that selectively reflects blue light, and the same is applicable to the configuration, in a case where a wavelength range of visible light is divided into two wavelength ranges, the S first diffraction element 18S that selectively reflects short wavelength side light and the L first diffraction element 18L that selectively reflects long wavelength side light among the two wavelength ranges are provided.

The example the light guide element according to the embodiment of the present invention is used for an image display device has been described. However, the light guide element according to the embodiment of the present invention is not limited to this example and can also be used as an optical element such as a sensor.

A sensor (sensing apparatus) in which the light guide element according to the embodiment of the present invention is used includes: the light guide element according to the embodiment of the present invention; and a light source that emits infrared light to the first diffraction element of the light guide element according to the embodiment of the present invention.

For example, in a case where the cholesteric liquid crystal layer that selectively reflects infrared light is provided in the light guide element according to the embodiment of the present invention and used, the light guide element can be used as an optical element for an eye-tracking sensor.

Among infrared light components incident into the first diffraction element 18 from the light source that emits infrared light, light that is reflected in a state where it is tilted in the arrow X1 direction propagates in the light guide plate 16 to be incident into the second A diffraction element 20a, is reflected (diffracted) by the second A diffraction element 20a, propagates in the light guide plate 16, is incident into the third A diffraction element 24a, and is reflected (diffracted) by the third A diffraction element 24a. As a result, the incidence angle into the interface of the light guide plate 16 is a critical angle or lower, and the light is emitted from the light guide plate 16 and is observed by the user U.

Light reflected from the pupil of the user U is incident into the light guide plate 16 again, and is reflected (diffracted) by the third A diffraction element 24a. As a result, the light travels back the above-described path and is emitted from the first diffraction element 18.

By detecting the light emitted from the first diffraction element 18 with an infrared sensor, eye-tracking can be performed. The light emitted from the first diffraction element 18 may be propagated in a direction different from infrared light emitted from the light source such as a beam splitter to be detected by an infrared sensor.

In this case, it is preferable that the light source that emits infrared light is a light source that emits circularly polarized light to the first diffraction element, for example, by using a light source that emits linearly polarized light and a λ/4 plate in combination.

In the above-described example, in the first diffraction element, the second diffraction element, and the third diffraction element, a cholesteric liquid crystal layer is used as a liquid crystal diffraction element. However, the present invention is not limited to this configuration. Various liquid crystal diffraction elements can be used as the liquid crystal diffraction element used in the present invention as long as they have the liquid crystal alignment pattern in which the optical axis 40A derived from the liquid crystal compound 40 continuously rotates in at least one in-plane direction.

In addition, in the present invention, a liquid crystal diffraction element that has the liquid crystal alignment pattern where the optical axis continuously rotates in at least one in-plane direction and in which the liquid crystal compound is not helically twisted in the thickness direction and does not rotate can also be used.

Figure 11:
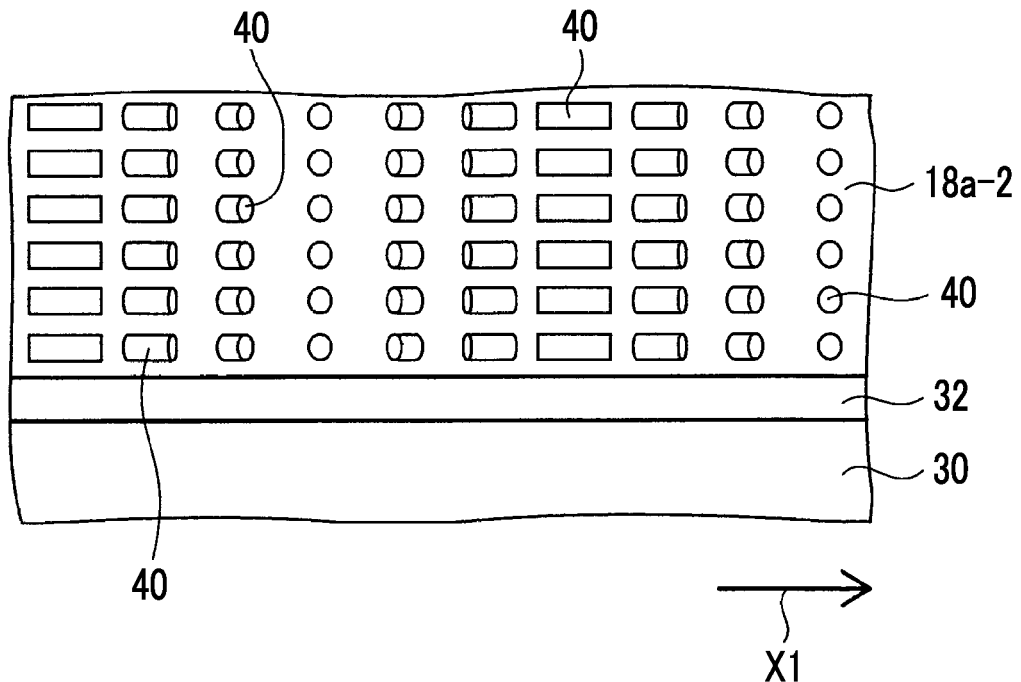
FIG. 11 is a diagram conceptually showing another example of the first A diffraction element.

FIG. 11 shows a first A diffraction element 18a-2 as a diffraction element corresponding to the first A diffraction element 18a of the first diffraction element 18, and an example thereof will be described.

Figure 12:
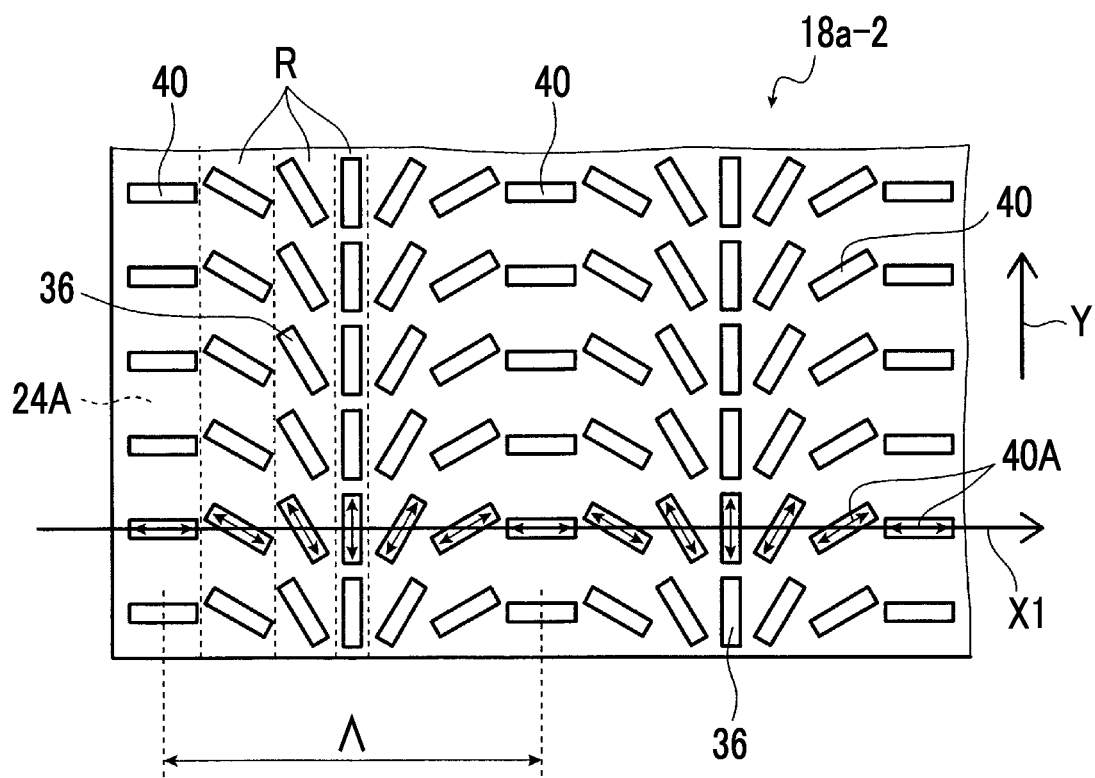
FIG. 12 is a plan view showing the first A diffraction element shown in FIG. 11.

As shown in FIG. 12, as in the first A diffraction element 18a, the first A diffraction element 18a-2 has the liquid crystal alignment pattern in which the optical axis 40A of the liquid crystal compound 40 continuously rotates in the arrow X1 direction. FIG. 12 also shows only the liquid crystal compound of the surface of the alignment film 32 as in FIG. 6.

In the first A diffraction element 18a-2, the liquid crystal compound 40 forming the diffraction element (liquid crystal layer) is not helically twisted and does not rotate in the thickness direction, and the optical axis 40A is positioned at the same position in the plane direction. The liquid crystal layer can be formed by not adding a chiral agent to a liquid crystal composition during the formation of the cholesteric liquid crystal layer.

As described above, the first A diffraction element 18a-2 has the liquid crystal alignment pattern in which the direction of the optical axis 40A derived from the liquid crystal compound 40 changes while continuously rotating in the arrow X direction in a plane, that is, in the one in-plane direction indicated by arrow X.

On the other hand, regarding the liquid crystal compound 40 forming the first A diffraction element 18a-2, the liquid crystal compounds 40 having the same direction of the optical axes 40A are arranged at regular intervals in the Y direction perpendicular to the arrow X1 direction, that is, the Y direction perpendicular to the one in-plane direction in which the optical axis 40A continuously rotates.

In other words, regarding the liquid crystal compound 40 forming the first A diffraction element 18a-2, in the liquid crystal compounds 40 arranged in the Y direction, angles between the directions of the optical axes 40A and the arrow X1 direction are the same.

In the liquid crystal compounds arranged in the Y direction in the first A diffraction element 18a-2, the angles between the optical axes 40A and the arrow X direction (the one in-plane direction in which the direction of the optical axis of the liquid crystal compound 40 rotates) are the same. Regions where the liquid crystal compounds 40 in which the angles between the optical axes 40A and the arrow X direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference $\Delta n$ in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference $\Delta n$ in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference $\Delta n$ in refractive index is the same as the difference in refractive index of the liquid crystal compound 40.

In a case where circularly polarized light is incident into the first A diffraction element 18a-2, the light is refracted such that the direction of the circularly polarized light is converted.

Figure 13:
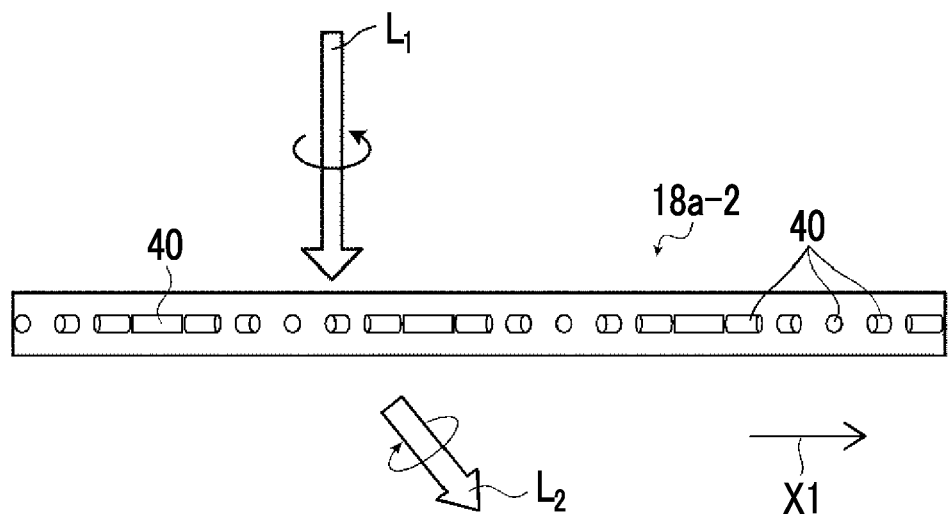
FIG. 13 is a conceptual diagram showing an action of the first A diffraction element shown in FIG. 11.
Figure 14:
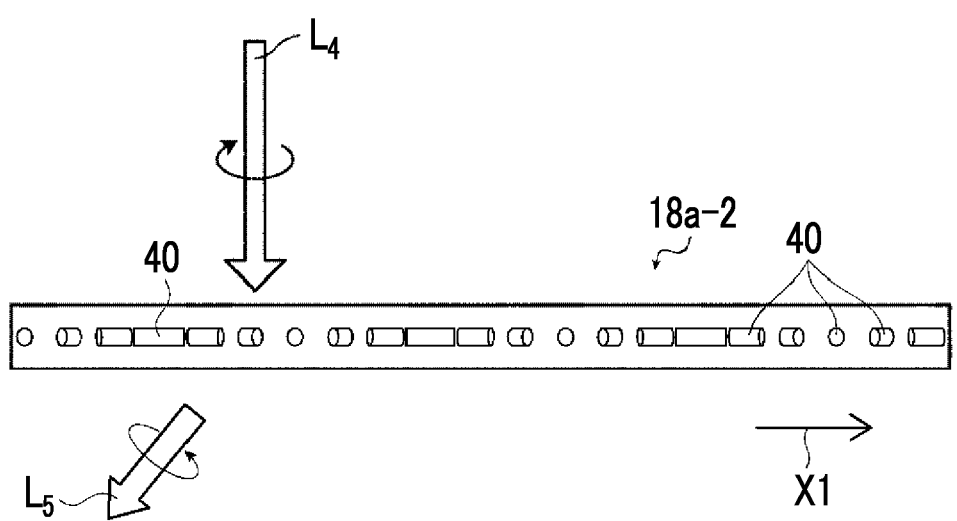
FIG. 14 is a conceptual diagram showing the action of the first A diffraction element shown in FIG. 11.

This action is conceptually shown in FIGS. 13 and 14. In the first A diffraction element 18a-2, the value of the product of the difference in refractive index of the liquid crystal compound and the thickness of the optically-anisotropic layer is $\lambda/2$.

As shown in FIG. 13, in a case where the value of the product of the difference in refractive index of the liquid crystal compound and the thickness of the optically-anisotropic layer in the first A diffraction element 18a-2 is $\lambda/2$ and incidence light $L_1$ as left circularly polarized light is incident into the first A diffraction element 18a-2, the incidence light $L_1$ transmits through the first A diffraction element 18a-2 to be imparted with a phase difference of 180° such that the transmitted light $L_2$ is converted into right circularly polarized light.

In addition, the liquid crystal alignment pattern formed in the first A diffraction element 18a-2 is a pattern that is periodic in the arrow X direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as shown in FIG. 14, in a case where the value of the product of the difference in refractive index of the liquid crystal compound and the thickness of the optically-anisotropic layer in the first A diffraction element 18a-2 is $\lambda/2$ and incidence light $L_4$ of right circularly polarized light is incident into the first A diffraction element 18a-2, the incidence light $L_4$ transmits through the first A diffraction element 18a-2 to be imparted with a phase difference of 180° such that the incidence light $L_4$ is converted into transmitted light $L_5$ of left circularly polarized light.

In addition, the liquid crystal alignment pattern formed in the first A diffraction element 18a-2 is a pattern that is periodic in the arrow X direction, and the incidence light $L_4$ is right circularly polarized light. Therefore, the transmitted light $L_5$ travels in a direction opposite to that of the incidence light $L_1$ as left circularly polarized light and different from the traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

As in the first A diffraction element 18a or the like, by changing the single period A of the liquid crystal alignment pattern formed in the first A diffraction element 18a-2, refraction angles of the transmitted light components $L_2$ and $L_5$ can be adjusted. Specifically, even in the first A diffraction element 18a-2, as the single period A of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrow X1 direction, the refraction direction of transmitted light can be reversed. That is, in the example FIGS. 11 to 14, the rotation direction of the optical axis 40A toward the arrow X direction is clockwise. By setting this rotation direction to be counterclockwise, the refraction direction of transmitted light can be reversed.

Accordingly, by using the diffraction element such as the first A diffraction element 18a-2 for the first diffraction element and/or the third diffraction element and providing the diffraction element on the display element 12 side of the light guide plate 16, the FOV of AR glasses or the like can be extended due to the same effect as the image display device 10 in which the cholesteric liquid crystal layer is used as the diffraction element, and the light use efficiency can also be improved.

The diffraction element including the liquid crystal layer in which the liquid crystal compound 40 does not helically rotate as in the first A diffraction element 18a-2 is suitably used in an aspect where the diffraction elements are provided at different positions in the plane direction of the light guide plate 16 as shown in FIG. 9.

From the viewpoint of diffraction efficiency, even in a case where the liquid crystal diffraction element that allows transmission of incidence light and diffracts incidence light is used, it is preferable to use a liquid crystal diffraction element including liquid crystal having a region where the liquid crystal compound is twisted and rotates (the twisted angle is less than 360°).

In order to improve visibility for the light guide element and the image display device according to the embodiment of the present invention, an diffractive optical method of enlarging an exit pupil may be used.

Specifically, an optical method of using a plurality of diffraction elements (diffraction components), that is, a diffractive optical method of using in-coupling, intermediate and out-coupling diffractive element can be used. This method is described in detail in JP2008-546020A.

Hereinabove, the light guide element and the image display device according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Reference Example 1

(Formation of Alignment Film)

A glass substrate was used as the support. The following alignment film-forming coating solution was applied to the support by spin coating. The support on which the coating film of the alignment film-forming coating solution was formed was dried using a hot plate at 60° C. for 60 seconds. As a result, an alignment film was formed.
Alignment Film-Forming Coating Solution

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

(Exposure of Alignment Film)

The alignment film was exposed using the exposure device shown in FIG. 15 to form an alignment film P-1 having an alignment pattern.

In the exposure device, a laser that emits laser light having a wavelength (325 nm) was used as the laser. The exposure dose of the interference light was 300 mJ/cm$^2$. The single period (the length over which the optical axis rotates by 180°) of an alignment pattern formed by interference of two laser beams was controlled by changing an intersecting angle (intersecting angle α) between the two beams.

(Formation of First A Diffraction Element)

As the liquid crystal composition forming the first A diffraction element, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-1 | 0.08 parts by mass |
| Methyl ethyl ketone | 2840.00 parts by mass |

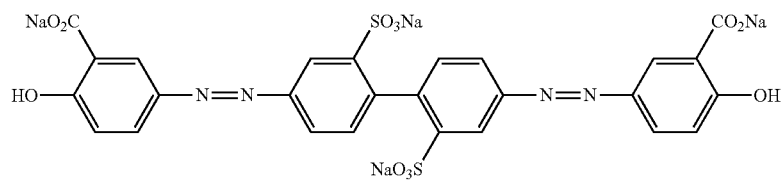

Rod-shaped Liquid Crystal Compound L-1

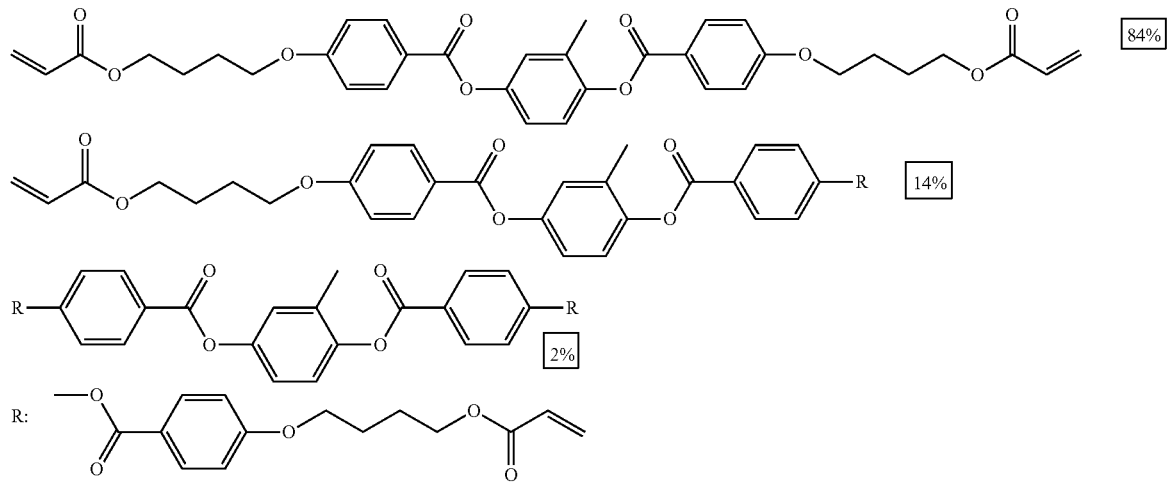

Chiral Agent Ch-1

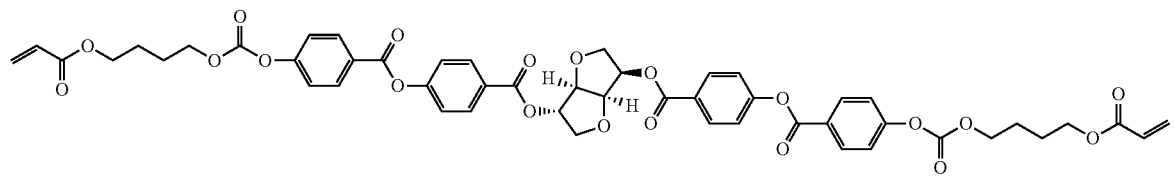 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Leveling Agent T-1

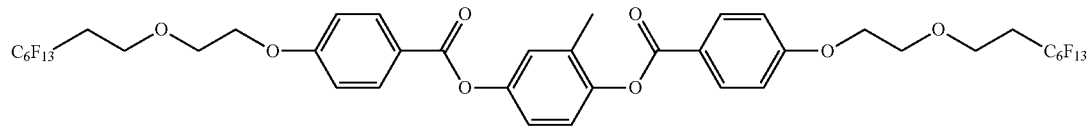

The first A diffraction element was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film 32 was reflected from a lower surface of the liquid crystal layer to an upper surface thereof.

First, in order to form the first layer, the following composition A-1 was applied to the alignment film P-1, and the coating film was heated on a hot plate at 95° C. Next, after being cooled to 25° C., the coating film was irradiated with ultraviolet light having a wavelength of 365 nm at an irradiation dose of 300 mJ/cm² using a high-pressure mercury lamp in a nitrogen atmosphere. As a result, the alignment of the liquid crystal compound was immobilized. In this case, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, the first A diffraction element was formed. In a case where a cross-section of a coating layer was observed with a scanning electron microscope (SEM), the cholesteric liquid crystalline phase had 8 pitches. In addition, the slope pitch of tilted surfaces of bright portions and dark portions with respect to a main surface was 0.40 μm. Regarding the slope pitch, an interval between bright portions or between dark portions in the normal direction with respect to the slope was set as an ½ surface pitch. The bright portions and the dark portions described herein refer to bright portions and dark portions derived from a cholesteric liquid crystalline phase in a case where a cross-section of the cholesteric liquid crystal layer was observed with a SEM.

It was verified using a polarizing microscope that the first A diffraction element had a periodically aligned surface as shown in FIG. 6. In a case where a cross-section of the coating layer was observed with a SEM, in the liquid crystal alignment pattern of the first A diffraction element, the single period over which the optical axis of the liquid crystal compound rotated by 180° was 0.525 μm.

(Formation of First B Diffraction Element)

A composition A-2 was prepared using the same method as that of the composition A-1 forming the first A diffraction element, except that the following chiral agent Ch-2 was used as the chiral agent and the amount of the chiral agent was changed to 9.50 parts by mass. This composition A-2 is a liquid crystal composition forming a cholesteric liquid crystal layer (cholesteric liquid crystalline phase) that reflects left circularly polarized light.

Chiral Agent Ch-2

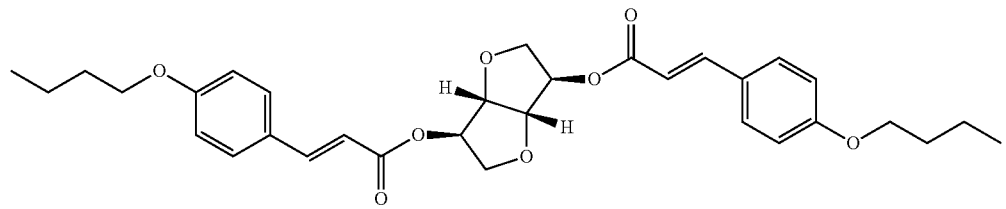 [SMILES: CCCCOc1ccc(/C=C/C(=O)O[C@@H]2CO[C@@H]3[C@H]2OC[C@H]3OC(=O)/C=C/c2ccc(OCCCC)cc2)cc1]

Using the prepared composition A-2, a first B diffraction element was formed on the first A diffraction element with the same method as that of the first A diffraction element. In a case where a cross-section of the coating layer was observed with a SEM, the cholesteric liquid crystalline phase had 8 pitches. In addition, the slope pitch of tilted surfaces of bright portions and dark portions with respect to a main surface was 0.40 μm.

It was verified using a polarizing microscope that the first B diffraction element had a periodically aligned surface as shown in FIG. 6. In the liquid crystal alignment pattern of the first B diffraction element, the single period over which the optical axis of the liquid crystal compound rotated by 180° was 0.525 μm.

As a result, the first A diffraction element and the first B diffraction element having the same one in-plane direction in which the optical axis of the liquid crystal compound rotated were laminated to prepare a first diffraction element (refer to FIG. 8), the first A diffraction element being a cholesteric liquid crystal layer that has a right helical twisted direction and selectively reflects right circularly polarized light, and the first B diffraction element being a cholesteric liquid crystal layer that has a left helical twisted direction and selectively reflects left circularly polarized light.

Reference Example 2

Methyl ethyl ketone was applied to the first A diffraction element according to Reference Example 1 by spin coating, and an alignment film was formed on the first A diffraction element using the same method as that during the formation of the first A diffraction element. The alignment film was exposed using the same method as that during the formation of the first A diffraction element, except that the alignment pattern was formed by exposing the alignment film in a state where each of the optical axes of the λ/4 plates 72A and 72B of the exposure device shown in FIG. 15 was rotated by 90°. By forming the cholesteric liquid crystal layer on the alignment film using the same method as that of the first A diffraction element, the first B diffraction element was formed.

As a result, the first A diffraction element and the first B diffraction element having opposite one in-plane directions in which the optical axis of the liquid crystal compound rotated were laminated to prepare a first diffraction element (refer to FIG. 8), the first A diffraction element being a cholesteric liquid crystal layer that has a right helical twisted direction and selectively reflects right circularly polarized light, and the first B diffraction element being a cholesteric liquid crystal layer that has a right helical twisted direction and selectively reflects left circularly polarized light.

Reference Example 3

The first A diffraction element was prepared using the same method as that of Reference Example 1.

A first B diffraction element was formed using the same method as that during the formation of the cholesteric liquid crystal layer of the first A diffraction element, except that the composition A-1 was changed to the composition of the first B diffraction element according to Reference Example 1. The formed first A diffraction element and the formed first B diffraction element were bonded to each other to be adjacent to each other on another glass substrate using an adhesive (SK DINE 2057, manufactured by Soken Chemical & Engineering Co., Ltd.). In this case, the one in-plane directions in which the optical axis of the liquid crystal compound rotated were the same.

As a result, the first A diffraction element and the first B diffraction element having the same one in-plane direction in which the optical axis of the liquid crystal compound rotated were disposed to be adjacent to each other to prepare a first diffraction element (refer to FIG. 9), the first A diffraction element being a cholesteric liquid crystal layer that has a right helical twisted direction and selectively reflects right circularly polarized light, and the first B diffraction element being a cholesteric liquid crystal layer that has a left helical twisted direction and selectively reflects left circularly polarized light.

Reference Example 4

The alignment film was formed using the same method as that of Reference Example 1.

An alignment pattern was formed using the same method as that of Reference Example 1 by exposing the alignment film using the exposure device shown in FIG. 15 in a state where half of the alignment film was masked to block light.

An alignment film P-2 was exposed using the same method as that during the formation of the first A diffraction element, except that the alignment pattern was formed by exposing the remaining half of the alignment film in a state where the region where the alignment pattern was formed was masked to block light and each of the optical axes of the λ/4 plates 72A and 72B of the exposure device shown in FIG. 15 was rotated by 90°.

A diffraction element (cholesteric liquid crystal layer) was formed on the alignment film P-2 using the same method as that of the first A diffraction element according to Reference Example 1.

As a result, the first A diffraction element and the first B diffraction element having opposite one in-plane directions in which the optical axis of the liquid crystal compound rotated were disposed to be adjacent to each other to prepare a first diffraction element (refer to FIG. 9), the first A diffraction element being a cholesteric liquid crystal layer that has a right helical twisted direction and selectively reflects right circularly polarized light, and the first B diffraction element being a cholesteric liquid crystal layer that has a right helical twisted direction and selectively reflects right circularly polarized light.

Reference Example 5

(Formation of Alignment Film)

An alignment film P-3 was formed on the support using the same method as that of Reference Example 1, except that, in a case where the alignment film was exposed using the exposure device shown in FIG. 15, the intersecting angle between two light components was changed.

(Formation of First A Diffraction Element)

A composition A-3 was prepared using the same method as that of the composition A-1 forming the first A diffraction element according to Reference Example 1, except that the amount of the chiral agent was changed to 6.77 parts by mass. This composition A-3 is a liquid crystal composition forming a cholesteric liquid crystal layer (cholesteric liquid crystalline phase) that reflects right circularly polarized light.

A first A diffraction element was formed on the surface of the alignment film P-3 using the same method as that of the first A diffraction element according to Reference Example 1, except that the composition A-3 was used. In a case where a cross-section of the coating layer was observed with a SEM, the cholesteric liquid crystalline phase had 8 pitches. In addition, the slope pitch of tilted surfaces of bright portions and dark portions with respect to a main surface was 0.34 µm.

It was verified using a polarizing microscope that the first A diffraction element had a periodically aligned surface as shown in FIG. 5. In a case where a cross-section of the coating layer was observed with a SEM, in the liquid crystal alignment pattern of the first A diffraction element, the single period over which the optical axis of the liquid crystal compound rotated by 180° was 0.445 µm.

(Formation of First B Diffraction Element)

A composition A-4 was prepared using the same method as that of the composition A-2 forming the first B diffraction element, except that the amount of the chiral agent was changed to 11.30 parts by mass. This composition A-4 is a liquid crystal composition forming a cholesteric liquid crystal layer that reflects left circularly polarized light.

A second B diffraction element was formed on the surface of the first A diffraction element using the same method as that of the first B diffraction element according to Reference Example 1, except that the composition A-4 was used. In a case where a cross-section of the coating layer was observed with a SEM, the cholesteric liquid crystalline phase had 8 pitches. In addition, the slope pitch of tilted surfaces of bright portions and dark portions with respect to a main surface was 0.34 µm.

It was verified using a polarizing microscope that the first B diffraction element had a periodically aligned surface as shown in FIG. 5. In the liquid crystal alignment pattern of the second cholesteric liquid crystal layer, the single period over which the optical axis of the liquid crystal compound rotated by 180° was 0.445 µm.

As a result, the first A diffraction element and the first B diffraction element having the same one in-plane direction in which the optical axis of the liquid crystal compound rotated were laminated to prepare a first diffraction element shown in FIG. 8 (refer to FIG. 8), the first A diffraction element being a cholesteric liquid crystal layer that has a right helical twisted direction and selectively reflects right circularly polarized light, and the first B diffraction element being a cholesteric liquid crystal layer that has a left helical twisted direction and selectively reflects left circularly polarized light.

Reference Example 6

(Formation of Alignment Film)

An alignment film P-4 was formed on the support using the same method as that of Example 1, except that, in a case where the alignment film was exposed using the exposure device shown in FIG. 15, the intersecting angle between two light components was changed.

(Formation of First A Diffraction Element)

A composition A-5 was prepared using the same method as that of the composition A-1 forming the first A diffraction element according to Reference Example 1, except that the amount of the chiral agent was changed to 4.69 parts by mass. This composition A-3 is a liquid crystal composition forming a cholesteric liquid crystal layer (cholesteric liquid crystalline phase) that reflects right circularly polarized light.

A first A diffraction element was formed on the surface of the alignment film P-4 using the same method as that of the first A diffraction element according to Reference Example 1, except that the composition A-5 was used. In a case where a cross-section of the coating layer was observed with a SEM, the cholesteric liquid crystalline phase had 8 pitches. In addition, the slope pitch of tilted surfaces of bright portions and dark portions with respect to a main surface was 0.48 µm.

It was verified using a polarizing microscope that the first A diffraction element had a periodically aligned surface as shown in FIG. 6. In a case where a cross-section of the coating layer was observed with a SEM, in the liquid crystal alignment pattern of the first A diffraction element, the single period over which the optical axis of the liquid crystal compound rotated by 180° was 0.63 µm.

(Formation of First B Diffraction Element)

A composition A-6 was prepared using the same method as that of the composition A-2 forming the first A diffraction element, except that the amount of the chiral agent was changed to 7.87 parts by mass. This composition A-6 is a liquid crystal composition forming a cholesteric liquid crystal layer that reflects left circularly polarized light.

A first B diffraction element was formed on the surface of the first A diffraction element using the same method as that of the first B diffraction element according to Reference Example 1, except that the composition A-6 was used. In a case where a cross-section of the coating layer was observed with a SEM, the cholesteric liquid crystalline phase had 8 pitches. In addition, the slope pitch of tilted surfaces of bright portions and dark portions with respect to a main surface was 0.48 μm.

It was verified using a polarizing microscope that the first B diffraction element had a periodically aligned surface as shown in FIG. 6. In the liquid crystal alignment pattern of the second cholesteric liquid crystal layer, the single period over which the optical axis of the liquid crystal compound rotated by 180° was 0.63 μm.

As a result, the first A diffraction element and the first B diffraction element having the same one in-plane direction in which the optical axis of the liquid crystal compound rotated were laminated to prepare a first diffraction element (refer to FIG. 8), the first A diffraction element being a cholesteric liquid crystal layer that has a right helical twisted direction and selectively reflects right circularly polarized light, and the first B diffraction element being a cholesteric liquid crystal layer that has a left helical twisted direction and selectively reflects left circularly polarized light.

Reference Example 7

HoloLens (manufactured by Microsoft Corporation) was disassembled, and a surface relief diffraction element used as a video incidence portion was used as the first diffraction element.

[Evaluation of Diffraction Efficiency]

Regarding the prepared first diffraction element, the diffraction efficiency was measured using the following method.

Figure 16:
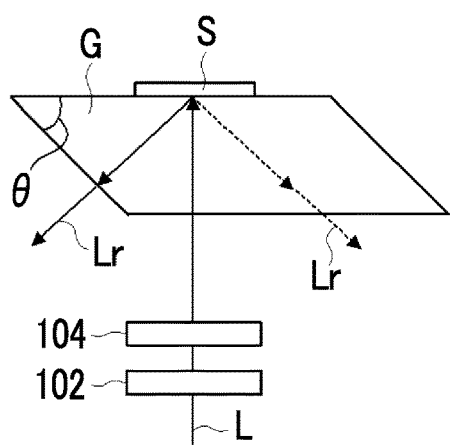
FIG. 16 is a conceptual diagram showing a method of measuring a diffraction efficiency in Examples.

As shown in FIG. 16, the prepared first diffraction element S was bonded to a light guide plate G in which both end surfaces were tilted (θ=45°). As the light guide plate G, glass having a refractive index of 1.52 was used.

Laser light L transmitted through a linear polarizer 102 and a λ/4 plate 104, was vertically incident into the light guide plate G, and was emitted from the slope of the light guide plate G as diffracted light Lr. In this case, the diffracted light Lr was measured.

The intensity of the diffracted light Lr was measured using a measuring instrument, and a ratio (Lr/Li×100[%]) of the intensity of the diffracted light Lr to the intensity Li of the laser light L as the incidence light was evaluated as the diffraction efficiency. Using the Fresnel formula, a reflectivity RD of the first diffraction element was obtained except for the effect of a reflectivity Ri on the surface of the light guide plate G during incidence and a reflectivity Ro on the surface of the light guide plate G during emission from the light guide plate G.

Reflectivity $RD=Lr/L/(1-Ri)/(1-Ro)$

As the reflectivity obtained using the Fresnel formula, an average value of reflectivities of S waves and P waves was used.

In Reference Examples 1 to 4 and 7, laser light L having a wavelength of 532 nm was used. In Reference Example 5, laser light L having a wavelength of 450 nm was used. In Reference Example 6, laser light L having a wavelength of 635 nm was used. Further, in Reference Examples 1, 3, 5, 6, and 7, each of right circularly polarized light and left circularly polarized light was incident for the evaluation. In Reference Examples 2 and 4, right circularly polarized light was incident for the evaluation.

In addition, in Reference Examples 1 to 6, incidence light was guided in two directions. Therefore, the light components in the two directions were evaluated, and the average value thereof was evaluated as the diffraction efficiency.

In addition, in HoloLens used in Reference Example 7, three light guide plates were used. The diffraction efficiency of the diffraction elements in each of the light guide plates was measured, and the diffraction efficiency during lamination was calculated and evaluated as the diffraction efficiency of the first diffraction element.

A case where the diffraction efficiency was 80% or higher was evaluated as A

A case where the diffraction efficiency was 70% or higher and lower than 80% was evaluated as B A case where the diffraction efficiency was 60% or higher and lower than 70% was evaluated as C A case where the diffraction efficiency was lower than 60% was evaluated as D

[Light Guide Direction]

In the above-described evaluation of the diffraction efficiency, a light guide direction was detected.

The results are shown in the following table.

TABLE 1

|  |  | Reference Example 1 | Reference Example 2 | Reference Example 3 | Reference Example 4 | Reference Example 5 | Reference Example 6 | Reference Example 7 |
|---|---|---|---|---|---|---|---|---|
| First A Diffraction Element | Single Period [μm] | 0.525 | 0.525 | 0.525 | 0.525 | 0.445 | 0.63 | — |
|  | Helical Twisted Direction | Right | Right | Right | Right | Right | Right | — |
|  | Slope Pitch [μm] | 0.4 | 0.4 | 0.4 | 0.4 | 0.34 | 0.48 | — |
| First B Diffraction Element | Single Period [μm] | 0.525 | 0.525 | 0.525 | 0.525 | 0.445 | 0.63 | — |
|  | Helical Twisted Direction | Left | Right | Left | Right | Left | Left | — |
|  | Slope Pitch [μm] | 0.4 | 0.4 | 0.4 | 0.4 | 0.34 | 0.48 | — |
| One In-Plane Direction in which Optical Axis Rotates |  | Same | Opposite | Same | Opposite | Same | Same | — |
| Disposition of Diffraction Elements |  | Laminated | Laminated | Plane Direction | Plane Direction | Laminated | Laminated | — |
| Evaluation | Diffraction Efficiency | A | A | A | A | A | A | D |
|  | Light Guide Direction | Two Directions | Two Directions | Two Directions | Two Directions | Two Directions | Two Directions | One Direction |

As shown in Table 1, in the first diffraction elements according to Reference Examples 1 to 6 in which the light guide element according to the embodiment of the present invention was used, light components were able to be guided in two different directions, and the diffraction efficiency of incident light was also high. Accordingly, in a case where the light guide plate and the image display device according to the embodiment of the present invention are used for AR glasses or the like, a high-brightness image can be displayed with high light use efficiency.

On the other hand, in the first diffraction element according to Reference Example 7 in which the surface relief grating was used, the light guide direction was one direction, the diffraction efficiency of incidence light was also low, and in case of being used for AR glasses or the like, the brightness of the display image was lower than that of an image displayed by the display element.

Example 1

(First Diffraction Element)

A first diffraction element was prepared using the same method as that of Reference Example 1. The first diffraction element had a rectangular shape of 10×10 mm.

As described above, the first diffraction element was the first diffraction element shown in FIG. 8, in which the single period over which the optical axis of the liquid crystal compound rotated by 180° was 0.525 µm, the slope pitch of tilted surfaces of bright portions and dark portions with respect to a main surface was 0.40 µm, and the first A diffraction element and the first B diffraction element having the same one in-plane direction in which the optical axis of the liquid crystal compound rotated were laminated, the first A diffraction element being a cholesteric liquid crystal layer that has a right helical twisted direction and selectively reflects right circularly polarized light, and the first B diffraction element being a cholesteric liquid crystal layer that has a left helical twisted direction and selectively reflects left circularly polarized light.

(Second Diffraction Element)
<Formation of Alignment Film>

An alignment film P-5 was formed on the surface of the support using the same method as that of Reference Example 1, except that, in a case where the alignment film was exposed using the exposure device shown in FIG. 15, the intersecting angle between two light components was changed.

<Second A Diffraction Element>

Using the composition A-1, a cholesteric liquid crystal layer was formed on the surface of the alignment film P-5 with the same method as that of the first A diffraction element according to Reference Example 1. As a result, a second A diffraction element was prepared. The second A diffraction element had a rectangular shape of 10×20 mm.

In a case where a cross-section of the coating layer was observed with a SEM, in the liquid crystal alignment pattern of the first A diffraction element, the single period over which the optical axis of the liquid crystal compound rotated by 180° was 0.32 µm.

The cholesteric liquid crystal layer of the second A diffraction element was a cholesteric liquid crystal layer in which the slope pitch of tilted surfaces of bright portions and dark portions with respect to a main surface was 0.40 µm, the cholesteric liquid crystal layer having a right helical twisted direction and selectively reflecting right circularly polarized light. The thickness of the cholesteric liquid crystal layer was adjusted such that the cholesteric liquid crystalline phase had 2 pitches.

<Second B Diffraction Element>

Using the composition A-2, a cholesteric liquid crystal layer was formed on the surface of the alignment film P-5 with the same method as that of the first B diffraction element according to Reference Example 1. As a result, a second B diffraction element was prepared. The second B diffraction element had a rectangular shape of 10×20 mm.

In a case where a cross-section of the coating layer was observed with a SEM, in the liquid crystal alignment pattern of the first A diffraction element, the single period over which the optical axis of the liquid crystal compound rotated by 180° was 0.32 µm.

The cholesteric liquid crystal layer of the second B diffraction element was a cholesteric liquid crystal layer in which the slope pitch of tilted surfaces of bright portions and dark portions with respect to a main surface was 0.40 µm, the cholesteric liquid crystal layer having a left helical twisted direction and selectively reflecting left circularly polarized light. The thickness of the cholesteric liquid crystal layer was adjusted such that the cholesteric liquid crystalline phase had 2 pitches.

(Third Diffraction Element)

Using the composition A-1, a cholesteric liquid crystal layer was formed on the surface of the same alignment film P-1 as that of Reference Example 1 with the same method as that of the first A diffraction element according to Reference Example 1. As a result, a third A diffraction element was formed. Accordingly, the third A diffraction element is a diffraction element in which the single period over which the optical axis of the liquid crystal compound rotated by 180° was 0.525 µm and the slope pitch of tilted surfaces of bright portions and dark portions with respect to a main surface was 0.40 µm, the diffraction element reflecting right circularly polarized light. The thickness of the cholesteric liquid crystal layer was adjusted such that the cholesteric liquid crystalline phase had 2 pitches.

On the other hand, using the composition A-2, a cholesteric liquid crystal layer was formed on the surface of the same alignment film P-1 as that of Reference Example 1 with the same method as that of the first B diffraction element according to Reference Example 1. As a result, a third B diffraction element was formed. Accordingly, the third B diffraction element is a diffraction element in which the single period over which the optical axis of the liquid crystal compound rotated by 180° was 0.525 µm and the slope pitch of tilted surfaces of bright portions and dark portions with respect to a main surface was 0.40 µm, the diffraction element reflecting left circularly polarized light. The thickness of the cholesteric liquid crystal layer was adjusted such that the cholesteric liquid crystalline phase had 2 pitches.

The third A diffraction element and the third B diffraction element were disposed to face each other and were bonded using a heat-sensitive adhesive. In this case, the one in-plane direction in which the optical axis of the liquid crystal compound rotated in the third A diffraction element and the one in-plane direction in which the optical axis of the liquid crystal compound rotated in the third B diffraction element intersected with each other at an angle of 40°. In addition, the third A diffraction element and the third B diffraction element were laminated such that the one in-plane direction in which the optical axis of the liquid crystal compound rotated was the same as the one in-plane direction in which the optical axis of the liquid crystal compound rotated in the first diffraction element.

Next, the support and the alignment film of the third B diffraction element were peeled off from each other. As a result, the third A diffraction element and the third B diffraction element were laminated to prepare a third diffraction element (refer to FIG. 8), the third A diffraction element being a cholesteric liquid crystal layer that has a right helical twisted direction and selectively reflects right circularly polarized light, and the third B diffraction element being a cholesteric liquid crystal layer that has a left helical twisted direction and selectively reflects left circularly polarized light. The third diffraction element had a rectangular shape of 30×50 mm.

A light guide plate formed of glass and having a rectangular shape of 80×80 mm was prepared.

The first diffraction element was bonded to a position of an upper center portion (position at a distance of 20 mm from the center) of the light guide plate using a heat-sensitive adhesive.

In addition, the second A diffraction element was bonded to a left side position (position at a distance of 5 mm) of the first diffraction element of the light guide plate using a heat-sensitive adhesive, and the second B diffraction element was bonded to a right side position (position at a distance of 5 mm) of the first diffraction element of the light guide plate using a heat-sensitive adhesive.

In this case, the elements were disposed such that, with respect to the one in-plane direction in which the optical axis of the liquid crystal compound rotated in the first diffraction element, the angle of the one in-plane direction in which the optical axis of the liquid crystal compound rotated in the second A diffraction element was 145° and the angle of the one in-plane direction in which the optical axis of the liquid crystal compound rotated in the second B diffraction element was 35° (refer to FIG. 1).

The second A diffraction element and the second B diffraction element were disposed such that the one in-plane direction in which the optical axis of the liquid crystal compound rotated clockwise faced downward (the third diffraction element).

Further, the third diffraction element was bonded to a position of a lower center portion (at a distance of 10 mm from the first diffraction element) using a heat-sensitive adhesive. In this case, the elements were disposed such that, with respect to the one in-plane direction in which the optical axis of the liquid crystal compound rotated in the first diffraction element, the angle of the one in-plane direction in which the optical axis of the liquid crystal compound rotated in the third A diffraction element was 110° and the angle of the one in-plane direction in which the optical axis of the liquid crystal compound rotated in the third B diffraction element was 70°. The third A diffraction element and the third B diffraction element were disposed such that the one in-plane direction in which the optical axis of the liquid crystal compound rotated clockwise faced the right side (the second B diffraction element) (refer to FIG. 1).

As a result, a light guide element in which the first diffraction element, the second diffraction element, and the third diffraction element were provided on the light guide plate was prepared.

A display that emitted an image of right circularly polarized light to the first A diffraction element and emitted an image of left circularly polarized light to the first B diffraction element was prepared. This display was a projection type liquid crystal display element in which a projection light source and a convex lens were combined with a reflective type liquid crystal display element. Linearly polarized light emitted from the reflective type liquid crystal display element was converted into right circularly polarized light and left circularly polarized light by the λ/4 plate.

This display was disposed to emit an image to the first diffraction element. As a result, an image display device was prepared.

Comparative Example

An image display device was prepared using the same method as described above, except that the first A diffraction element, the second B diffraction element, and the third A diffraction element were not provided. The incidence light was right circularly polarized light.

[Evaluation]

An image was displayed using the prepared image display device, and the field of view was evaluated. In the evaluation, a green light image was used.

As a result, it was verified that the field of view in Example was able to be extended as compared to the field of view in Comparative Example.

Example 2

(First Diffraction Element)
<Formation of Alignment Film>

An alignment film P-1AB was formed on the support using the same method as that of Reference Example 1, except that, in a case where the alignment film was exposed using the exposure device shown in FIG. 15, the intersecting angle between two light components was changed.

<First A Diffraction Element B>

As the liquid crystal composition forming the first A diffraction element B, the following composition AB-1 was prepared. This composition AB-1 is a liquid crystal composition forming a cholesteric liquid crystal layer (cholesteric liquid crystalline phase) that reflects right circularly polarized light.

Composition AB-1

| | |
|---|---|
| Rod-shaped liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 5.00 parts by mass |
| Chiral agent Ch-2 | 1.00 parts by mass |
| Methyl ethyl ketone | 203.00 parts by mass |

The above-described liquid crystal composition AB-1 was applied to the alignment film P-1AB using a spin coater.

The coating film of the liquid crystal composition AB-1 was heated on a hot plate at 80° C. for 3 minutes (180 sec). Next, in a first exposure step, the coating film was exposed using a high-pressure mercury lamp at 80° C. in the air atmosphere through a long pass filter of 300 nm and a short pass filter of 350 nm. The first exposure step was performed such that the light irradiation dose measured at a wavelength of 315 nm was 10 mJ/cm$^2$. Further, the coating film was irradiated with ultraviolet light having a wavelength of 365 nm at 80° C. at an irradiation dose of 600 mJ/cm$^2$ using a high-pressure mercury lamp in a nitrogen atmosphere (second exposure step). As a result, the liquid crystal composition AB-1 was cured, the alignment of the liquid crystal compound was immobilized, and a cholesteric liquid crystal layer was formed.

Thus, a liquid crystal diffraction element including the support, the alignment film, and the cholesteric liquid crystal layer was prepared.

It was verified using a polarizing microscope that the cholesteric liquid crystal layer had a periodically aligned surface as shown in FIG. 6.

The cholesteric liquid crystal layer was cut in a direction along the rotation direction of the optical axis, and a cross-section was observed with a SEM. As a result, a shape was observed in which the slope pitch P continuously increased and the tilt angle $\theta_{hp}$ continuously increased in the thickness direction from the alignment film side to the side away from the alignment film. The tilt angle $\theta_{hp}$ (tilt angle $\theta_{hp}$ of the bright portions/the dark portions) refers to an angle of the bright portions or the dark portions with respect to the main surface of the cholesteric liquid crystal layer.

In a case where a cross-section was observed with a SEM, the cholesteric liquid crystalline phase had 8 pitches. In addition, the slope pitch (average value in the thickness direction) of tilted surfaces of bright portions and dark portions with respect to the main surface was 0.32 µm. In addition, in the liquid crystal alignment pattern of the cholesteric liquid crystal layer, the single period over which the optical axis of the liquid crystal compound rotated by 180° was 0.29 µm.

While changing the incidence angle of light to be measured, in-plane retardations Re (in-plane Re) in a fast axis plane and a slow axis plane were measured using "Axoscan" (manufactured by Axometrics, Inc.). The measurement wavelength was set to 750 nm. In addition, the incidence angle of the light to be measured was set to a range of −70° to 70°.

As a result, a direction in which the in-plane retardation of the cholesteric liquid crystal layer was minimum was tilted with respect to the normal line. The result shows that the major axis direction of each liquid crystal molecule was aligned to be tilted with respect to the main surface of the cholesteric liquid crystal layer.

<First A Diffraction Element G>

An alignment film P-1AG was formed on the support using the same method as that of the first A diffraction element B, except that, in a case where the alignment film was exposed using the exposure device shown in FIG. 15, the intersecting angle between two light components was changed.

In addition, a composition AG-1 was prepared using the same method as that of the composition AB-1 forming the first A diffraction element B, except that the amount of the chiral agent Ch-1 was changed to 3.90 parts by mass.

A first A diffraction element G was formed using the same method as that of the first A diffraction element B, except that the composition AG-1 was used. In a case where a cross-section of the coating layer was observed with a SEM, the cholesteric liquid crystalline phase had 8 pitches. In addition, the slope pitch (average value in the thickness direction) of tilted surfaces of bright portions and dark portions with respect to the main surface was 0.37 µm.

It was verified using a polarizing microscope that the first A diffraction element G had a periodically aligned surface as shown in FIG. 6. In the liquid crystal alignment pattern of the cholesteric liquid crystal layer, the single period over which the optical axis of the liquid crystal compound rotated by 180° was 0.34 µm.

<First A Diffraction Element R>

An alignment film P-1AR was formed on the support using the same method as that of the first A diffraction element B, except that, in a case where the alignment film was exposed using the exposure device shown in FIG. 15, the intersecting angle between two light components was changed.

In addition, a composition AG-1 was prepared using the same method as that of the composition AB-1 forming the first A diffraction element B, except that the amount of the chiral agent Ch-1 was changed to 3.10 parts by mass.

A first A diffraction element G was formed using the same method as that of the first A diffraction element B, except that the composition AG-1 was used. In a case where a cross-section of the coating layer was observed with a SEM, the cholesteric liquid crystalline phase had 8 pitches. In addition, the slope pitch (average value in the thickness direction) of tilted surfaces of bright portions and dark portions with respect to the main surface was 0.45 µm.

It was verified using a polarizing microscope that the first A diffraction element G had a periodically aligned surface as shown in FIG. 6. In the liquid crystal alignment pattern of the cholesteric liquid crystal layer, the single period over which the optical axis of the liquid crystal compound rotated by 180° was 0.40 µm.

(Second Diffraction Element)

An alignment film was formed on the support using the same method as that of the first A diffraction element B, except that, in a case where the alignment film was exposed using the exposure device shown in FIG. 15, the intersecting angle between two light components was changed.

In addition, a liquid crystal composition was prepared using the same method as that of the composition AB-1 forming the first A diffraction element B, except that the amount of the chiral agent Ch-1 and the amount of methyl ethyl ketone were appropriately changed.

A second diffraction element was formed using the same method as that of the first A diffraction element B, except that the liquid crystal composition was used. During the formation of the second diffraction element, the liquid crystal layer was cured and the cholesteric liquid crystal layer was formed in the second exposure step without performing the first exposure step.

<Second A Diffraction Element B>

The prepared cholesteric liquid crystalline phase had 2 pitches. In addition, the slope pitch (average value in the thickness direction) of tilted surfaces of bright portions and dark portions with respect to the main surface was 0.34 µm. In addition, in the liquid crystal alignment pattern of the cholesteric liquid crystal layer, the single period over which the optical axis of the liquid crystal compound rotated by 180° was 0.21 µm.

<Second A Diffraction Element G>

The prepared cholesteric liquid crystalline phase had 2 pitches. In addition, the slope pitch (average value in the thickness direction) of tilted surfaces of bright portions and dark portions with respect to the main surface was 0.40 µm. In addition, in the liquid crystal alignment pattern of the cholesteric liquid crystal layer, the single period over which the optical axis of the liquid crystal compound rotated by 180° was 0.24 µm.

<Second A Diffraction Element R>

The prepared cholesteric liquid crystalline phase had 2 pitches. In addition, the slope pitch (average value in the thickness direction) of tilted surfaces of bright portions and dark portions with respect to the main surface was 0.48 µm. In addition, in the liquid crystal alignment pattern of the cholesteric liquid crystal layer, the single period over which the optical axis of the liquid crystal compound rotated by 180° was 0.28 µm.

(Third Diffraction Element)

An alignment film was formed on the support using the same method as that of the first A diffraction element B, except that, in a case where the alignment film was exposed using the exposure device shown in FIG. 15, the intersecting angle between two light components was changed.

In addition, a liquid crystal composition was prepared using the same method as that of the composition AB-1 forming the first A diffraction element B, except that the amount of the chiral agent Ch-1 and the amount of methyl ethyl ketone were appropriately changed. A third diffraction element was formed using the same method as that of the first A diffraction element B, except that the liquid crystal composition was used. During the formation of the third diffraction element, the liquid crystal layer was cured and the cholesteric liquid crystal layer was formed in the second exposure step without performing the first exposure step.

<Third A Diffraction Element B>

The prepared cholesteric liquid crystalline phase had 2 pitches. In addition, the slope pitch (average value in the thickness direction) of tilted surfaces of bright portions and dark portions with respect to the main surface was 0.32 µm. In addition, in the liquid crystal alignment pattern of the cholesteric liquid crystal layer, the single period over which the optical axis of the liquid crystal compound rotated by 180° was 0.29 µm.

<Third A Diffraction Element G>

The prepared cholesteric liquid crystalline phase had 2 pitches. In addition, the slope pitch (average value in the thickness direction) of tilted surfaces of bright portions and dark portions with respect to the main surface was 0.37 µm. In addition, in the liquid crystal alignment pattern of the cholesteric liquid crystal layer, the single period over which the optical axis of the liquid crystal compound rotated by 180° was 0.34 µm.

<Third A Diffraction Element R>

The prepared cholesteric liquid crystalline phase had 2 pitches. In addition, the slope pitch (average value in the thickness direction) of tilted surfaces of bright portions and dark portions with respect to the main surface was 0.45 µm. In addition, in the liquid crystal alignment pattern of the cholesteric liquid crystal layer, the single period over which the optical axis of the liquid crystal compound rotated by 180° was 0.40 µm.

As the first B diffraction element, the second B diffraction element, and the third B diffraction element, the first A diffraction element, the second A diffraction element, and the third A diffraction element prepared as described above were used.

(Preparation of Light Guide Element)

As the light guide plate, a glass light guide plate formed of glass and having a size of 60 mm×70 mm and a thickness of 1 mm was used. As first A and first B incidence diffraction elements, the first A diffraction element B, the first A diffraction element G, and the first A diffraction element R were used. As second A and second B intermediate diffraction elements, the second A diffraction element B, the second A diffraction element G, and the second A diffraction element R were used. As third A and third B emission diffraction elements, the third A diffraction element B, the third A diffraction element G, and the third A diffraction element R were used.

The incidence diffraction element was cut into a size having a diameter of 6 mm and used. The intermediate diffraction element was cut into a size of 15 mm (maximum)×25 mm and used. The emission diffraction element was cut into a size of 20 mm×25 mm and used.

During the cutting of each of the diffraction elements, a cutting direction and a periodic direction of the diffraction structures were adjusted such that, in a case where the diffraction elements were disposed on the light guide plate, the periodic direction of the diffraction structures was a predetermined direction.

Each of the prepared diffraction elements was bonded to one main surface of the light guide plate using an adhesive.

Regarding the disposition of the diffraction elements, the first A incidence diffraction element was disposed on the left of the upper center of the main surface of the light guide plate, the first B incidence diffraction element was disposed on the right of the upper center of the main surface of the light guide plate, the second A intermediate diffraction element was disposed on the left side of the first A incidence diffraction element, and the second B intermediate diffraction element was disposed on the right side of the first B incidence diffraction element.

In addition, the third A and third B emission diffraction elements were laminated at a center position of the main surface of the light guide plate. The emission diffraction elements and the incidence diffraction elements were disposed to be spaced from each other by 13 mm in the up-down direction.

The first A incidence diffraction element and the first B incidence diffraction element were disposed to be spaced from each other by 1 mm in the left-right direction. The first A incidence diffraction element and the second A intermediate diffraction element were disposed to be spaced from each other by 1 mm in the left-right direction. The first B incidence diffraction element and the second B intermediate diffraction element were disposed to be spaced from each other by 1 mm in the left-right direction.

In addition, the first A incidence diffraction element was disposed such that diffracted light faced the left (the second A intermediate diffraction element side), and the first B incidence diffraction element was disposed such that diffracted light faced the right (the second B intermediate diffraction element side).

The respective intermediate diffraction elements were disposed in a state where the periodic direction of the diffraction elements was adjusted such that incident light was diffracted in the direction of the emission diffraction element.

In addition, the emission diffraction elements were disposed such that an angle between the periodic direction of the liquid crystal alignment pattern of the third A emission diffraction element and the periodic direction of the liquid crystal alignment pattern of the third B emission diffraction element was 90°, the liquid crystal alignment pattern being a pattern in which the optical axis of the liquid crystal compound continuously rotated in the one in-plane direction. The first A incidence diffraction element, the first B incidence diffraction element, the second A intermediate diffraction element, and the second B intermediate diffraction element were disposed such that the periodic directions of the liquid crystal alignment patterns thereof matched with the third A and third B emission diffraction elements.

In addition, the first A and first B incidence diffraction elements were laminated in order of the first diffraction element B, the first diffraction element G, and the first diffraction element R from the light guide plate side. In addition, the second A and second B intermediate diffraction elements were laminated in order of the second diffraction element B, the second diffraction element G, and the second diffraction element R from the light guide plate side. In addition, the third A and third B emission diffraction elements were laminated in order of the third diffraction element B, the third diffraction element G, and the third diffraction element R from the light guide plate side.

As a result, a light guide element was prepared.

Comparative Example 2

A cholesteric liquid crystal layer was formed using the same method as that of Example 2, except that, during the formation of the first A incidence diffraction element, the liquid crystal layer was cured in the second exposure step without performing the first exposure step. The slope pitches of the first A incidence diffraction element in the thickness direction were substantially the same.

In addition, a light guide element was prepared using the same method as that of Example 2, except that the first B incidence diffraction element, the second B intermediate diffraction element, and the third B emission diffraction element were not provided.

Example 3

A first diffraction element, a second diffraction element, and a third diffraction element were prepared using the same method as that of Example 2.
(Preparation of Light Guide Element)
The first A and first B diffraction elements G, the second A and second B diffraction elements G, and the third A and third B diffraction element G were disposed on a first light guide plate.
A light guide element was prepared using the same method as that of Example 2, except that the first A and first B diffraction elements B, the second A and second B diffraction elements B, and the third A and third B diffraction element B and the first A and first B diffraction elements R, the second A and second B diffraction elements R, and the third A and third B diffraction element R were disposed on a second light guide plate to prepare the light guide element.
On the second light guide plate, the first A and first B incidence diffraction elements were laminated in order of the first diffraction element B and the first diffraction element R in order from the light guide plate side, the second A and second B intermediate diffraction elements were laminated in order of the second diffraction element B and the second diffraction element R from the light guide plate side, and the third A and third B emission diffraction elements were laminated in order of the third diffraction element B and the third diffraction element R from the light guide plate side.
Further, the first light guide plate and the second light guide plate were disposed to overlap each other such that light was incident from the first light guide plate side.

Comparative Example 3

A cholesteric liquid crystal layer was formed using the same method as that of Example 3, except that, during the formation of the first A incidence diffraction element, the liquid crystal layer was cured in the second exposure step without performing the first exposure step. The slope pitches of the first A incidence diffraction element in the thickness direction were substantially the same.
In addition, a light guide element was prepared using the same method as that of Example 3, except that the first B incidence diffraction element, the second B intermediate diffraction element, and the third B emission diffraction element were not provided.

Example 4

(First Diffraction Element)
<Formation of Alignment Film>
An alignment film P-1A was formed on the support using the same method as that of Reference Example 1, except that, in a case where the alignment film was exposed using the exposure device shown in FIG. 15, the intersecting angle between two light components was changed.
<First A Diffraction Element S>
As the liquid crystal composition forming the first A diffraction element S, the following composition AS-1 was prepared. This composition AS-1 is a liquid crystal composition forming a cholesteric liquid crystal layer (cholesteric liquid crystalline phase) that reflects right circularly polarized light.
Composition AS-1

| | |
|---|---|
| Rod-shaped liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-3 | 4.00 parts by mass |
| Methyl ethyl ketone | 142.00 parts by mass |

Chiral Agent Ch-3

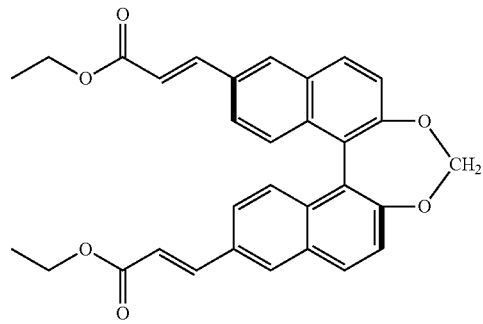

The above-described liquid crystal composition AS-1 was applied to the alignment film P-1AS using a spin coater.
The coating film of the liquid crystal composition AS-1 was heated on a hot plate at 100° C. for 3 minutes (180 sec). Next, in a first exposure step, the coating film was exposed using a high-pressure mercury lamp at 100° C. in a nitrogen atmosphere through a long pass filter of 300 nm and a short pass filter of 350 nm. The first exposure step was performed such that the light irradiation dose measured at a wavelength of 315 nm was 9 mJ/cm². Further, the coating film was irradiated with ultraviolet light having a wavelength of 365 nm at 100° C. at an irradiation dose of 1000 mJ/cm² using a high-pressure mercury lamp in a nitrogen atmosphere (second exposure step). As a result, the liquid crystal composition AS-1 was cured, the alignment of the liquid crystal compound was immobilized, and a cholesteric liquid crystal layer was formed.
Thus, a liquid crystal diffraction element including the support, the alignment film, and the cholesteric liquid crystal layer was prepared.
It was verified using a polarizing microscope that the cholesteric liquid crystal layer had a periodically aligned surface as shown in FIG. 6.
The cholesteric liquid crystal layer was cut in a direction along the rotation direction of the optical axis, and a cross-section was observed with a SEM. As a result, a shape was observed in which the slope pitch P continuously increased and the tilt angle $\theta_{hp}$ continuously increased in the thickness direction from the alignment film side to the side away from the alignment film. The tilt angle $\theta_{hp}$ (tilt angle $\theta_{hp}$ of the bright portions/the dark portions) refers to an angle of the bright portions or the dark portions with respect to the main surface of the cholesteric liquid crystal layer.
In a case where a cross-section was observed with a SEM, the cholesteric liquid crystalline phase had 8 pitches. In addition, the slope pitch (average value in the thickness direction) of tilted surfaces of bright portions and dark portions with respect to the main surface was 0.35 μm. In addition, in the liquid crystal alignment pattern of the cholesteric liquid crystal layer, the single period over which the optical axis of the liquid crystal compound rotated by 180° was 0.29 µm.

While changing the incidence angle of light to be measured, in-plane retardations Re (in-plane Re) in a fast axis plane and a slow axis plane were measured using "Axoscan" (manufactured by Axometrics, Inc.). The measurement wavelength was set to 750 nm. In addition, the incidence angle of the light to be measured was set to a range of −70° to 70°.

As a result, a direction in which the in-plane retardation of the cholesteric liquid crystal layer was minimum was tilted with respect to the normal line. The result shows that the major axis direction of each liquid crystal molecule was aligned to be tilted with respect to the main surface of the cholesteric liquid crystal layer.

<First A Diffraction Element L>

An alignment film P-1AL was formed on the support using the same method as that of the first A diffraction element S, except that, in a case where the alignment film was exposed using the exposure device shown in FIG. 15, the intersecting angle between two light components was changed.

In addition, a composition AL-1 was prepared using the same method as that of the composition AS-1 forming the first A diffraction element S, except that the amount of the chiral agent Ch-3 was changed to 3.40 parts by mass.

A first A diffraction element L was formed using the same method as that of the first A diffraction element S, except that the composition AL-1 was used. In a case where a cross-section of the coating layer was observed with a SEM, the cholesteric liquid crystalline phase had 8 pitches. In addition, the slope pitch (average value in the thickness direction) of tilted surfaces of bright portions and dark portions with respect to the main surface was 0.40 µm.

It was verified using a polarizing microscope that the first A diffraction element G had a periodically aligned surface as shown in FIG. 6. In the liquid crystal alignment pattern of the cholesteric liquid crystal layer, the single period over which the optical axis of the liquid crystal compound rotated by 180° was 0.42 µm.

<Second A Diffraction Element S>

An alignment film was formed on the support using the same method as that of the first A diffraction element S, except that, in a case where the alignment film was exposed using the exposure device shown in FIG. 15, the intersecting angle between two light components was changed.

In addition, a liquid crystal composition was prepared using the same method as that of the composition AS-1 forming the first A diffraction element S, except that the amount of methyl ethyl ketone was appropriately changed.

A second A diffraction element S was formed using the same method as that of the first A diffraction element S, except that the liquid crystal composition was used.

The prepared cholesteric liquid crystalline phase had 2 pitches. In addition, the slope pitch (average value in the thickness direction) of tilted surfaces of bright portions and dark portions with respect to the main surface was 0.35 µm. In addition, in the liquid crystal alignment pattern of the cholesteric liquid crystal layer, the single period over which the optical axis of the liquid crystal compound rotated by 180° was 0.21 µm.

<Second A Diffraction Element L>

An alignment film was formed on the support using the same method as that of the first A diffraction element L, except that, in a case where the alignment film was exposed using the exposure device shown in FIG. 15, the intersecting angle between two light components was changed.

In addition, a liquid crystal composition was prepared using the same method as that of the liquid crystal composition forming the first A diffraction element L, except that the amount of methyl ethyl ketone was appropriately changed.

A second A diffraction element L was formed using the same method as that of the first A diffraction element L, except that the liquid crystal composition was used.

The prepared cholesteric liquid crystalline phase had 2 pitches. In addition, the slope pitch (average value in the thickness direction) of tilted surfaces of bright portions and dark portions with respect to the main surface was 0.40 µm. In addition, in the liquid crystal alignment pattern of the cholesteric liquid crystal layer, the single period over which the optical axis of the liquid crystal compound rotated by 180° was 0.30 µm.

<Third A Diffraction Element S>

An alignment film was formed on the support using the same method as that of the first A diffraction element S, except that, in a case where the alignment film was exposed using the exposure device shown in FIG. 15, the intersecting angle between two light components was changed.

In addition, a liquid crystal composition was prepared using the same method as that of the composition AS-1 forming the first A diffraction element S, except that the amount of methyl ethyl ketone was appropriately changed.

A third A diffraction element S was formed using the same method as that of the first A diffraction element S, except that the liquid crystal composition was used.

The prepared cholesteric liquid crystalline phase had 2 pitches. In addition, the slope pitch (average value in the thickness direction) of tilted surfaces of bright portions and dark portions with respect to the main surface was 0.35 µm. In addition, in the liquid crystal alignment pattern of the cholesteric liquid crystal layer, the single period over which the optical axis of the liquid crystal compound rotated by 180° was 0.29 µm.

<Third A Diffraction Element L>

An alignment film was formed on the support using the same method as that of the first A diffraction element L, except that, in a case where the alignment film was exposed using the exposure device shown in FIG. 15, the intersecting angle between two light components was changed.

In addition, a liquid crystal composition was prepared using the same method as that of the liquid crystal composition forming the first A diffraction element L, except that the amount of methyl ethyl ketone was appropriately changed.

A third A diffraction element L was formed using the same method as that of the first A diffraction element L, except that the liquid crystal composition was used.

The prepared cholesteric liquid crystalline phase had 2 pitches. In addition, the slope pitch (average value in the thickness direction) of tilted surfaces of bright portions and dark portions with respect to the main surface was 0.40 µm. In addition, in the liquid crystal alignment pattern of the cholesteric liquid crystal layer, the single period over which the optical axis of the liquid crystal compound rotated by 180° was 0.42 µm.

As the first B diffraction element, the second B diffraction element, and the third B diffraction element, the first A diffraction element, the second A diffraction element, and the third A diffraction element prepared as described above were used.

(Preparation of Light Guide Element)

The first A and first B diffraction elements S, the second A and second B diffraction elements S, and the third A and third B diffraction element S were disposed on a first light guide plate.

A light guide element was prepared using the same method as that of Example 3, except that the first A and first B diffraction elements L, the second A and second B diffraction elements L, and the third A and third B diffraction element L were disposed on a second light guide plate to prepare the light guide element.

Further, the first light guide plate and the second light guide plate were disposed to overlap each other such that light was incident from the first light guide plate side.

In Examples 2 to 4, a display that emitted an image of right circularly polarized light to the first A and first B incidence diffraction elements was prepared. This display was a projection type liquid crystal display element in which a projection light source and a convex lens were combined with a reflective type liquid crystal display element. Linearly polarized light emitted from the reflective type liquid crystal display element was converted into right circularly polarized light by the $\lambda/4$ plate.

This display was disposed to emit an image to the first diffraction element. As a result, an image display device was prepared.

In Comparative Examples 2 and 3, image display devices were prepared using the same method as described above, except that a display that emitted an image of right circularly polarized light to the first A incidence diffraction element was prepared.

[Evaluation of Field of View 1]

An image was displayed using the prepared image display device, and the field of view was evaluated. In the evaluation, a green light image was used.

As a result, it was verified that the field of view in Example was able to be extended as compared to the field of view in Comparative Example.

[Evaluation of Field of View 2]

Further, light was emitted to each of the light guide elements to evaluate the field of view.

As the light source, light components having a wavelength of 450 nm, a wavelength of 532 nm, and a wavelength of 635 nm were used for the evaluation.

Light emitted from the light source was caused to transmit through the linear polarizer and the $\lambda/4$ plate. As a result, right circularly polarized light was obtained. In Examples 2 to 4, this light was caused to be incident into the first A and first B incidence diffraction elements of the light guide element and was emitted from the emission diffraction elements. In this case, the amount of the emitted light was measured using a power meter. In Comparative Examples 2 and 3, this light was caused to be incident into the first A incidence diffraction element of the light guide element and was emitted from the emission diffraction elements. In this case, the amount of the emitted light was measured using a power meter. As a position to be measured, the light emitted from the center of the emission diffraction element was measured.

In addition, in a case where the normal direction to the main surface of the light guide plate was represented by 0°, the incidence angle of light into the incidence diffraction elements was changed on a basis of 2.5 from −30° to 30° (horizontal direction).

A pinhole was disposed such that the effective aperture of the power meter was 2 mmφ, and the light amount was measured for the evaluation such that the emitted light transmitted through the center of the pinhole. An angle range where the amount of the emitted light was 30% or higher with respect to the amount of the emitted light at the emission angle where the amount of the emitted light was the maximum was evaluated as the field of view. By performing the evaluation of each of the wavelengths, an angle range where the above-described conditions were satisfied at all the wavelengths was obtained as the field of view.

As a result, in Example 2, the field of view was extended to be 1.5 times or more than that of Comparative Example 2, and the amount of the emitted light was high in a wide angle range. In addition, in Examples 3 and 4, the field of view was extended to be 1.5 times or more than that of Comparative Example 3, and the amount of the emitted light was high in a wide angle range.

As can be seen from the above results, the effects of the present invention are obvious.

The present invention is applicable to various optical devices such as AR glasses in which light guiding is used.

EXPLANATION OF REFERENCES

10: image display device
12: display element
16: light guide plate
18: first diffraction element
18a-2: first A diffraction element
18R: R first diffraction element
18G: G first diffraction element
18B: B first diffraction element
18aR: first A diffraction element
18bR: first B diffraction element
18aG: first A diffraction element
18bG: first B diffraction element
18aB: first A diffraction element
18bB: first B diffraction element
20a: second A diffraction element
20b: second B diffraction element
24a: third A diffraction element
24b: third B diffraction element
30: support
32, 32R, 32G, 32B: alignment film
34: (cholesteric) liquid crystal layer
40: liquid crystal compound
40A: optical axis
60: exposure device
62: laser
64: light source
68: polarization beam splitter
70A, 70B: mirror
72A, 72B, 84: $\lambda/4$ plate
82: linear polarizer
90: photodetector
102: linear polarizer
104: $\lambda/4$ plate
$B_R$: right circularly polarized light of blue light
$G_R$: right circularly polarized light of green light
$R_R$: right circularly polarized light of red light
M: laser light
MA, MB: beam
MP: P polarized light
MS: S polarized light
$P_O$: linearly polarized light
$P_R$: right circularly polarized light
$P_L$: left circularly polarized light
Q, Q1, Q2: absolute phase E, E1, E2: equiphase surface
L1, L4: incidence light
L2, L5: transmitted light
U: user
G: light guide plate
S: sample (first diffraction element)

What is claimed is:

1. A light guide element comprising:
a light guide plate; and
a first diffraction element, a second diffraction element, and a third diffraction element that are provided on the light guide plate,
wherein the first diffraction element diffracts incident light in two or more different directions to be incident into the light guide plate,
the second diffraction element includes a plurality of diffraction elements that are provided to be spaced from each other in a plane direction of the light guide plate and diffract the light diffracted by the first diffraction element and propagated in the light guide plate to the third diffraction element,
the third diffraction element emits the light from the light guide plate,
at least one of the first diffraction element or the third diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction, and
the first diffraction element includes a first A diffraction element and a first B diffraction element that are arranged at different positions in the plane direction of the light guide plate and diffract light in different directions.

2. The light guide element according to claim 1, wherein the third diffraction element includes a third A diffraction element and a third B diffraction element that are laminated.

3. The light guide element according to claim 1, wherein the third diffraction element is a liquid crystal diffraction element and includes a third A diffraction element and a third B diffraction element, and
in the third A diffraction element and the third B diffraction element, one in-plane directions in which the direction of the optical axis derived from the liquid crystal compound continuously rotates in the liquid crystal alignment pattern intersect with each other.

4. The light guide element according to claim 1, wherein the third diffraction element is a liquid crystal diffraction element and has a region where the direction of the optical axis of the liquid crystal compound is helically twisted and rotates.

5. The light guide element according to claim 1, wherein the first diffraction element and the third diffraction element are the liquid crystal diffraction elements, and
in the first diffraction element and the third diffraction element, one in-plane directions in which the direction of the optical axis derived from the liquid crystal compound continuously rotates in the liquid crystal alignment pattern intersect with each other.

6. The light guide element according to claim 1, wherein the first diffraction element, the second diffraction element, and the third diffraction element are the liquid crystal diffraction elements,
in the first diffraction element, the second diffraction element, and the third diffraction element, one in-plane directions in which the direction of the optical axis derived from the liquid crystal compound continuously rotates in the liquid crystal alignment pattern intersect with each other, and
in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, and the single period of the second diffraction element is shorter than the single periods of the first diffraction element and the third diffraction element.

7. The light guide element according to claim 1, wherein the liquid crystal diffraction element includes a cholesteric liquid crystal layer obtained by immobilizing a cholesteric liquid crystalline phase.

8. The light guide element according to claim 1, wherein an in-plane retardation is measured from a direction tilted with respect to a normal direction and a normal line of a main surface of the liquid crystal diffraction element, and a direction in which the in-plane retardation is minimum in any one of a slow axis plane or a fast axis plane is tilted from the normal direction.

9. The light guide element according to claim 7, wherein in a cross-section of the cholesteric liquid crystal layer observed with a scanning electron microscope, bright portions and dark portions derived from a cholesteric liquid crystal phase are tilted with respect to a main surface of the cholesteric liquid crystal layer, and
an interval of lines between the bright portions or lines between the dark portions in the normal direction is represented by an ½ slope pitch, and a region where the slope pitch of the cholesteric liquid crystal layer varies depending on positions in a thickness direction is provided.

10. The light guide element according to claim 7, wherein in a cross-section of the cholesteric liquid crystal layer observed with a scanning electron microscope, bright portions and dark portions derived from a cholesteric liquid crystal phase are tilted with respect to a main surface of the cholesteric liquid crystal layer, and
a tilt angle of a line between the bright portions or between the dark portions with respect to a main surface of the cholesteric liquid crystal layer is represented by $\theta_{hp}$, and a region where the tilt angle $\theta_{hp}$ varies depending on positions in a thickness direction is provided.

11. The light guide element according to claim 1, wherein, in the liquid crystal alignment pattern of the liquid crystal diffraction element, a length over which the direction of the optical axis derived from the liquid crystal compound rotates by 180° in the one in-plane direction in which the direction of the optical axis derived from the liquid crystal compound changes while continuously rotating is set as a single period, and the single period is 1 µm or less.

12. The light guide element according to claim 1, wherein each of the first diffraction element, the second diffraction element, and the third diffraction element is the liquid crystal diffraction element and includes a blue diffraction layer corresponding to a blue image, a green diffraction layer corresponding to a green image, and a red diffraction layer corresponding to a red image and in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, and the red diffraction layer has a longest single period and the blue diffraction layer has a shortest single period.

13. The light guide element according to claim 1,
wherein the first diffraction element, the second diffraction element, and the third diffraction element are the liquid crystal diffraction elements,
a wavelength range of visible light is divided into two wavelength ranges, and each of the first diffraction element, the second diffraction element, and the third diffraction element includes a short wavelength side diffraction layer corresponding to a short wavelength side image and a long wavelength side diffraction layer corresponding to a long wavelength side image among the two wavelength ranges, and
in the liquid crystal alignment pattern, a length over which the direction of the optical axis derived from the liquid crystal compound rotates by 180° in the one in-plane direction in which the direction of the optical axis derived from the liquid crystal compound changes while continuously rotating is set as a single period, and the single period of the long wavelength side diffraction layer is longer than the single period of the short wavelength side diffraction layer.

14. An image display device comprising:
the light guide element according to claim 1; and
a display element that emits an image to the first diffraction element of the light guide element.

15. The image display device according to claim 14,
wherein the display element emits circularly polarized light to the first diffraction element.

16. A sensing apparatus comprising:
the light guide element according to claim 1; and
a light source that emits infrared light to the first diffraction element of the light guide element.

17. A light guide element comprising:
a light guide plate; and
a first diffraction element, a second diffraction element, and a third diffraction element that are provided on the light guide plate,
wherein the first diffraction element diffracts incident light in two or more different directions to be incident into the light guide plate,
the second diffraction element includes a plurality of diffraction elements that are provided to be spaced from each other in a plane direction of the light guide plate and diffract the light diffracted by the first diffraction element and propagated in the light guide plate to the third diffraction element,
the third diffraction element emits the light from the light guide plate,
at least one of the first diffraction element or the third diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction,
the first diffraction element includes a first A diffraction element and a first B diffraction element that are laminated and diffract light in different directions,
the first diffraction element is the liquid crystal diffraction element,
the first A diffraction element and the first B diffraction element each have a region where the direction of the optical axis of the liquid crystal compound is helically twisted in a thickness direction and rotates, and
in the first A diffraction element and the first B diffraction element, directions of the helical twist rotation in the thickness direction are opposite to each other and rotation directions of the direction of the optical axis derived from the liquid crystal compound that continuously rotates in the at least one in-plane direction in the liquid crystal alignment pattern are the same.

18. A light guide element comprising:
a light guide plate; and
a first diffraction element, a second diffraction element, and a third diffraction element that are provided on the light guide plate,
wherein the first diffraction element diffracts incident light in two or more different directions to be incident into the light guide plate,
the second diffraction element includes a plurality of diffraction elements that are provided to be spaced from each other in a plane direction of the light guide plate and diffract the light diffracted by the first diffraction element and propagated in the light guide plate to the third diffraction element,
the third diffraction element emits the light from the light guide plate,
at least one of the first diffraction element or the third diffraction element is a liquid crystal diffraction element that is formed of a composition including a liquid crystal compound and has a liquid crystal alignment pattern in which a direction of an optical axis derived from the liquid crystal compound changes while continuously rotating in at least one in-plane direction,
the first diffraction element includes a first A diffraction element and a first B diffraction element that are laminated and diffract light in different directions,
the first diffraction element is the liquid crystal diffraction element,
the first A diffraction element and the first B diffraction element have a region where the direction of the optical axis of the liquid crystal compound is helically twisted in a thickness direction and rotates, and
in the first A diffraction element and the first B diffraction element, directions of the helical twist rotation in the thickness direction are the same and rotation directions of the direction of the optical axis derived from the liquid crystal compound that continuously rotates in the at least one in-plane direction in the liquid crystal alignment pattern are different from each other.

* * * * *